(12) United States Patent
Chang et al.

(10) Patent No.: US 12,386,137 B2
(45) Date of Patent: Aug. 12, 2025

(54) IMAGING LENS ASSEMBLY, IMAGING LENS ASSEMBLY MODULE, CAMERA MODULE AND ELECTRONIC DEVICE

(71) Applicant: LARGAN PRECISION CO., LTD., Taichung (TW)

(72) Inventors: Ming-Shun Chang, Taichung (TW); Lin-An Chang, Taichung (TW); Ming-Ta Chou, Taichung (TW); Chun-Hua Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 561 days.

(21) Appl. No.: 17/830,626

(22) Filed: Jun. 2, 2022

(65) Prior Publication Data

US 2023/0135916 A1 May 4, 2023

(30) Foreign Application Priority Data

Oct. 28, 2021 (TW) .................... 110140160

(51) Int. Cl.
| | |
|---|---|
| *G02B 7/02* | (2021.01) |
| *B60R 11/00* | (2006.01) |
| *B60R 11/04* | (2006.01) |
| *G02B 7/00* | (2021.01) |
| *G02B 13/00* | (2006.01) |

(52) U.S. Cl.
CPC ............. *G02B 7/021* (2013.01); *G02B 7/003* (2013.01); *B60R 2011/004* (2013.01); *B60R 11/04* (2013.01); *G02B 13/001* (2013.01)

(58) Field of Classification Search
None
See application file for complete search history.

(56) References Cited

U.S. PATENT DOCUMENTS

| | | |
|---|---|---|
| 7,612,950 B2 | 11/2009 | Lee et al. |
| 7,830,610 B2 | 11/2010 | Nishizawa et al. |
| 8,908,282 B2 | 12/2014 | Yang et al. |
| 8,945,438 B2 | 2/2015 | Hanashiro et al. |
| 9,227,371 B2 | 1/2016 | Chang et al. |
| 9,393,747 B2 | 7/2016 | Watanabe et al. |
| 9,671,527 B2 | 6/2017 | Huang et al. |
| 9,703,017 B2 | 7/2017 | Ito et al. |

(Continued)

*Primary Examiner* — Ryan Crockett
(74) *Attorney, Agent, or Firm* — McClure, Qualey & Rodack, LLP

(57) ABSTRACT

An imaging lens assembly has an optical axis and includes at least one lens element. The at least one lens element includes an optical effective region and a peripheral portion. The peripheral portion includes an object-side surface, an image-side surface, a peripheral surface, an annular marking structure and at least one arc portion. The object-side surface faces towards an object side. The image-side surface faces towards an image side and corresponds to the object-side surface. The peripheral surface connects the object-side surface and the image-side surface. The annular marking structure is disposed on one of the object-side surface and the image-side surface, and the annular marking structure is an annular tip-ended protruding structure and surrounds the optical axis. The arc portion is disposed on the other one of the object-side surface and the image-side surface, and the arc portion is an annular protruding arc.

18 Claims, 25 Drawing Sheets

(56) References Cited

U.S. PATENT DOCUMENTS

| | | | |
|---|---|---|---|
| 10,185,114 B2 | 1/2019 | Ito | |
| 10,302,903 B2 * | 5/2019 | Lin | G02B 13/0045 |
| 10,451,852 B2 | 10/2019 | Chou et al. | |
| 10,527,813 B2 | 1/2020 | Kobayashi | |
| 10,656,377 B2 | 5/2020 | Lin et al. | |
| 10,795,135 B2 | 10/2020 | Chou et al. | |
| 10,866,381 B2 | 12/2020 | Yang et al. | |
| 10,928,554 B2 | 2/2021 | Chou | |
| 10,928,560 B2 | 2/2021 | Chou | |
| 10,996,421 B2 | 5/2021 | Yang et al. | |
| 2006/0158748 A1 * | 7/2006 | Hirata | G02B 27/62 359/811 |
| 2017/0322394 A1 * | 11/2017 | Chou | G02B 13/0055 |
| 2018/0129011 A1 * | 5/2018 | Tsai | H04N 23/55 |
| 2018/0335607 A1 * | 11/2018 | Lin | G02B 7/021 |
| 2020/0150421 A1 * | 5/2020 | Oouchi | G02B 7/021 |
| 2022/0050260 A1 * | 2/2022 | Lai | G02B 7/022 |

* cited by examiner

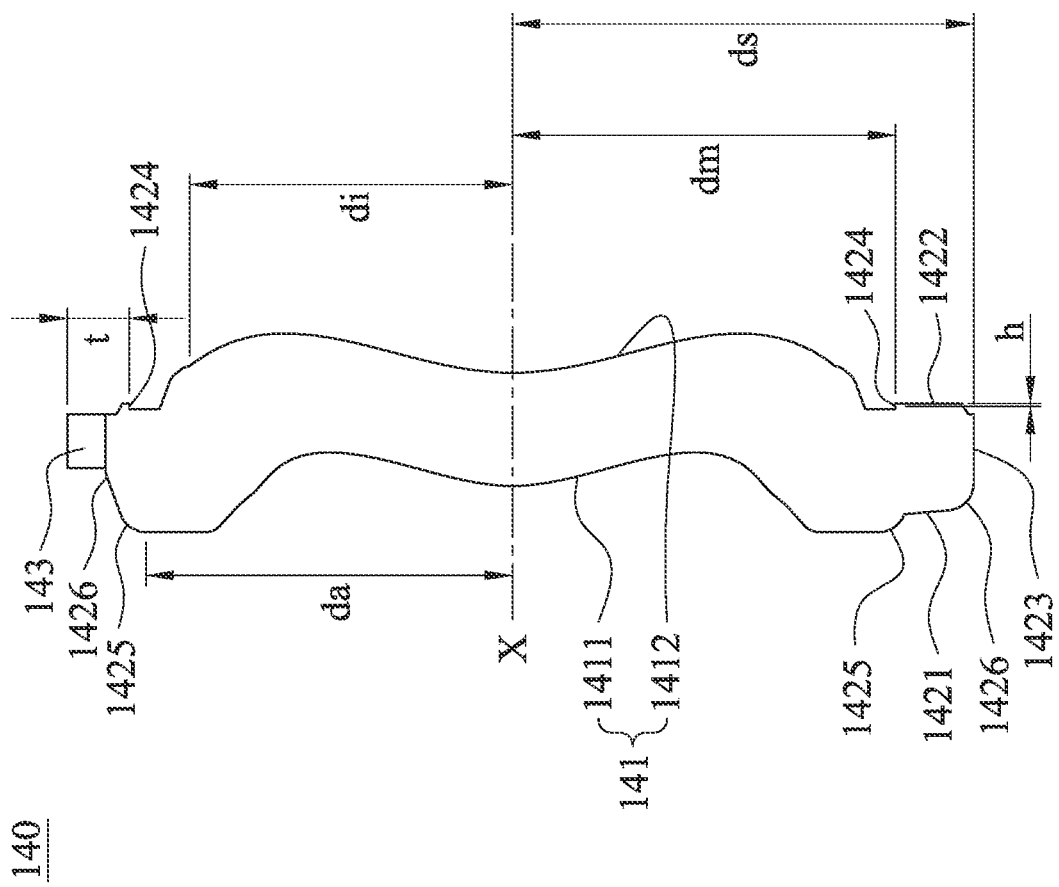

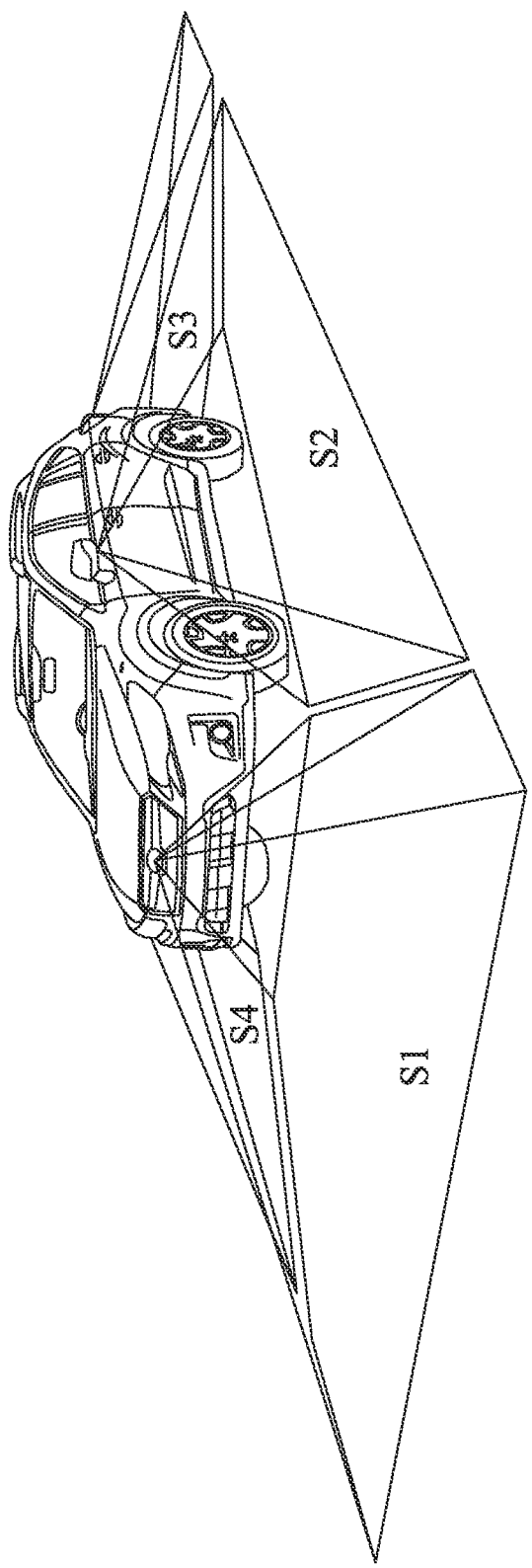

IMAGING LENS ASSEMBLY, IMAGING LENS ASSEMBLY MODULE, CAMERA MODULE AND ELECTRONIC DEVICE

RELATED APPLICATIONS

This application claims priority to Taiwan Application Serial Number 110140160, filed Oct. 28, 2021, which is herein incorporated by reference.

BACKGROUND

Technical Field

The present disclosure relates to an imaging lens assembly, an imaging lens assembly module and a camera module. More particularly, the present disclosure relates to an imaging lens assembly, an imaging lens assembly module and a camera module with compact size applicable to portable electronic devices.

Description of Related Art

In recent years, camera modules which are developed rapidly and have been filled with the lives of modern people are applied in various fields such as portable electronic devices, head mounted devices, vehicle devices and etc. Accordingly, the camera module and the image sensor are also flourished. However, as technology is more and more advanced, demands for the quality of the camera module of users have become higher and higher. Therefore, developing an imaging lens assembly module which can improve size accuracy and demolding yield rate of the lens element becomes an important and solving problem in industry.

SUMMARY

According to one aspect of the present disclosure, an imaging lens assembly has an optical axis and includes at least one lens element. The at least one lens element includes an optical effective region and a peripheral portion. The optical axis passes through the optical effective region. The peripheral portion surrounds the optical effective region and includes an object-side surface, an image-side surface, a peripheral surface, an annular marking structure and at least one arc portion. The object-side surface faces towards an object side. The image-side surface faces towards an image side and corresponds to the object-side surface. The peripheral surface connects the object-side surface and the image-side surface. The annular marking structure is disposed on one of the object-side surface and the image-side surface, and the annular marking structure is an annular tip-ended protruding structure and surrounds the optical axis. The arc portion is disposed on the other one of the object-side surface and the image-side surface, and the arc portion is an annular protruding arc. When a perpendicular distance between the annular marking structure and the optical axis is dm, a perpendicular distance between the arc portion and the optical axis is da, and a curvature radius of the arc portion is Ra, the following conditions are satisfied: $0.82 < da/dm < 1.18$; and $0.025 \text{ mm} \leq Ra \leq 0.5 \text{ mm}$.

According to one aspect of the present disclosure, an imaging lens assembly module includes a lens barrel and an imaging lens assembly. The imaging lens assembly is disposed in the inner space of the lens barrel, the imaging lens assembly has an optical axis and includes at least one lens element. The at least one lens element includes an optical effective region and a peripheral portion. The optical axis passes through the optical effective region. The peripheral portion surrounds the optical effective region and includes an object-side surface, an image-side surface, a peripheral surface, an annular marking structure and at least one arc portion. The object-side surface faces towards an object side. The image-side surface faces towards an image side and corresponds to the object-side surface. The peripheral surface connects the object-side surface and the image-side surface, and physically contacts one of the inner surfaces of the lens barrel. The annular marking structure is only disposed on the image-side surface, and the annular marking structure is an annular tip-ended protruding structure and surrounds the optical axis. The arc portion is disposed on the object-side surface, and the arc portion is an annular protruding arc. When a perpendicular distance between the annular marking structure and the optical axis is dm, a perpendicular distance between the arc portion and the optical axis is da, and a curvature radius of the arc portion is Ra, the following conditions are satisfied: $0.75 < da/dm < 1.25$; and $0.025 \text{ mm} \leq Ra \leq 0.5 \text{ mm}$.

According to one aspect of the present disclosure, a camera module includes the aforementioned imaging lens assembly module and an image sensor. The image sensor is disposed on an image surface of the imaging lens assembly module.

According to one aspect of the present disclosure, an electronic device includes the aforementioned camera module.

BRIEF DESCRIPTION OF THE DRAWINGS

The present disclosure can be more fully understood by reading the following detailed description of the embodiment, with reference made to the accompanying drawings as follows:

FIG. 1I shows another schematic view of the imaging lens assembly module according to the 1st embodiment in FIG. 1A.

FIG. 1J shows schematic view parameters of the third lens element according to the 1st embodiment in FIG. 1I.

FIG. 5D shows another schematic view of the vehicle device according to the 5th embodiment in FIG. 5A.

DETAILED DESCRIPTION

Figure 1A:
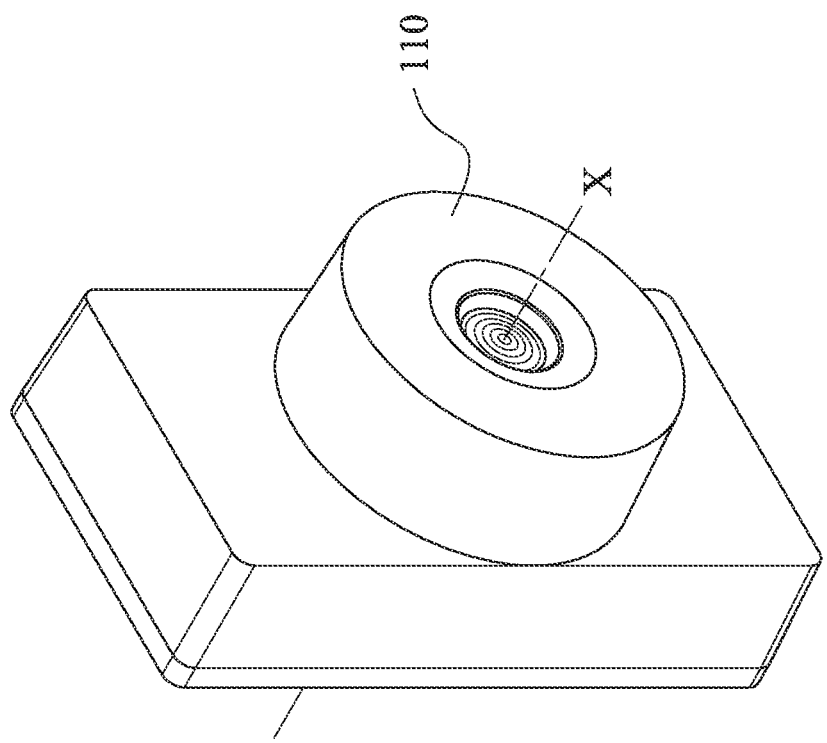
FIG. 1A shows a three-dimensional schematic view of an imaging lens assembly module according to the 1st embodiment of the present disclosure.

The present disclosure provides an imaging lens assembly which has an optical axis and includes at least one lens element. The lens element includes an optical effective region and a peripheral portion. The optical axis passes through the optical effective region. The peripheral portion surrounds the optical effective region and includes an object-side surface, an image-side surface, a peripheral surface, an annular marking structure and at least one arc portion. The object-side surface faces towards an object side. The image-side surface faces towards an image side and corresponds to the object-side surface. The peripheral surface connects the object-side surface and the image-side surface. The annular marking structure is disposed on one of the object-side surface and the image-side surface, and the annular marking structure is an annular tip-ended protruding structure and surrounds the optical axis. The arc portion is disposed on the other one of the object-side surface and the image-side surface, and the arc portion is an annular protruding arc. When a perpendicular distance between the annular marking structure and the optical axis is dm, a perpendicular distance between the arc portion and the optical axis is da, and a curvature radius of the arc portion is Ra, the following conditions are satisfied: 0.82<da/dm<1.18; and 0.025 mm≤Ra≤0.5 mm.

By disposing the annular marking structure only on one surface of the lens element and disposing the arc portion on the other surface, reflection of unnecessary light in the lens element can be reduced while the possibility of over reflection of unnecessary light can be prevented from disposing the annular marking structure on both of the object-side surface and the image-side surface of the lens element. Hence, by disposing the annular marking structure on the single side of the lens element and the arc portion on the other side thereof, size accuracy and demolding yield rate of the lens element can be improved.

Moreover, the annular marking structure can be for positioning the lens element so as to provide a function of compensating tolerance of production.

Specifically, the annular marking structure can be disposed on the image-side surface, and the arc portion is disposed on the object-side surface. The annular marking structure can be a step difference formed during demolding from a mold, a whole circular ring, or a ring with cutting edges, but the present disclosure is not limited thereto. Furthermore, a cross section of the annular marking structure can have an acute angle, wherein the acute angle is between 80 degrees and 100 degrees. In the embodiments, the acute angle is 90 degrees, but the present disclosure is not limited thereto. Moreover, the annular marking structure is an annular tip-ended protruding structure which has a sharped end. Specifically, a curvature radius of the end of the annular marking structure (Rm) can be less than 0.025 mm.

The lens element can be formed by injection molding and further include at least one gate trace, wherein the gate trace is disposed on the peripheral surface. Hence, the precision lens element with high accuracy and compactness can be provided.

When a distance from the annular marking structure to the gate trace along a direction perpendicular to the optical axis is t, the following condition can be satisfied: t≤0.4 mm. Hence, the efficiency of manufacturing during mass production process can be improved.

When the curvature radius of the arc portion is Ra, the following condition can be satisfied: 0.035 mm≤Ra≤0.45 mm. Hence, the possibility of adhesion between the lens element and the mold can be decreased, and it is favorable for quality management during demolding process.

When the perpendicular distance between the annular marking structure and the optical axis is dm, and a maximum radius of the peripheral surface is ds, the following condition can be satisfied: 0.7<dm/ds<1.0. Moreover, the following condition can be satisfied: 0.8<dm/ds<1.0. Hence, the coaxiality of two sides of the optical effective region can be improved.

The optical effective region can include an object-side optical surface and an image-side optical surface. The object-side optical surface faces towards the object side, the image-side optical surface faces towards the image side, and at least one of the object-side optical surface and the image-side optical surface is an optical aspheric surface. Hence, the lens element with high image resolution can be provided.

When a protruding height of the annular marking structure is h, the following condition can be satisfied: 0.0025 mm≤h≤0.1 mm. Hence, it is favorable for recognition by an instrument, and feasibility of demolding from the mold can be provided.

The present disclosure provides an imaging lens assembly module which includes a lens barrel and an imaging lens assembly. The lens barrel has a plurality of inner surfaces and forms an inner space. The imaging lens assembly is disposed in the inner space of the lens barrel. The imaging lens assembly has an optical axis and includes at least one lens element. The lens element includes an optical effective region and a peripheral portion. The optical axis passes through the optical effective region. The peripheral portion surrounds the optical effective region and includes an object-side surface, an image-side surface, a peripheral surface, an annular marking structure and at least one arc portion. The object-side surface faces towards an object side. The image-side surface faces towards an image side and corresponds to the object-side surface. The peripheral surface connects the object-side surface and the image-side surface and contacts one of the inner surfaces of the lens barrel physically. The annular marking structure is only disposed on the image-side surface, and the annular marking structure is an annular tip-ended protruding structure and surrounds the optical axis. The arc portion is disposed on the object-side surface, and the arc portion is an annular protruding arc. When a perpendicular distance between the annular marking structure and the optical axis is dm, a perpendicular distance between the arc portion and the optical axis is da, and a curvature radius of the arc portion is Ra, the following conditions are satisfied: 0.75<da/dm<1.25; and 0.025 mm≤Ra≤0.5 mm.

Hence, by disposing the annular marking structure on the image-side surface to improve the size accuracy of the lens element and disposing the arc portion on the object-side surface, demolding yield rate of the lens element can be improved.

Moreover, the annular marking structure can be for positioning the lens element so as to provide a function of compensating tolerance of production.

The object-side surface of the lens element can include an axial aligning structure for abutting against and aligning at center of an adjacent lens element. Hence, the yield rate of assembling can be improved so as to provide better image quality. Specifically, the axial aligning structure can include a tilt surface and a flat surface, and the tilt surface and the flat surface are for reducing tilting and shifting between the lens elements so as to align at center.

The image-side surface of the lens element can include an axial aligning structure for abutting against and aligning at center of an adjacent lens element. Hence, the yield rate of assembling can be improved so as to provide better image quality.

When a length of a region which the peripheral surface contacts the one of the inner surfaces along a direction parallel to the optical axis is L, the following condition can be satisfied: L<0.1 mm. Hence, the possibility of generation of stray light can be decreased.

When the perpendicular distance between the annular marking structure and the optical axis is dm, and a maximum radius of the image-side optical surface is di, the following condition can be satisfied: 0.3<di/dm<0.8. Hence, the replacement rate of the mold can be reduced so as to reduce manufacturing cost.

Each of the abovementioned features of the imaging lens assembly module can be utilized in various combinations for achieving the corresponding effects.

The present disclosure provides a camera module including the aforementioned imaging lens assembly module and an image sensor. The image sensor is disposed on an image surface of the imaging lens assembly module.

The present disclosure provides an electronic device including the aforementioned camera module.

According to the above description of the present disclosure, the following specific embodiments are provided for further explanation.

1st Embodiment

Figure 1B:
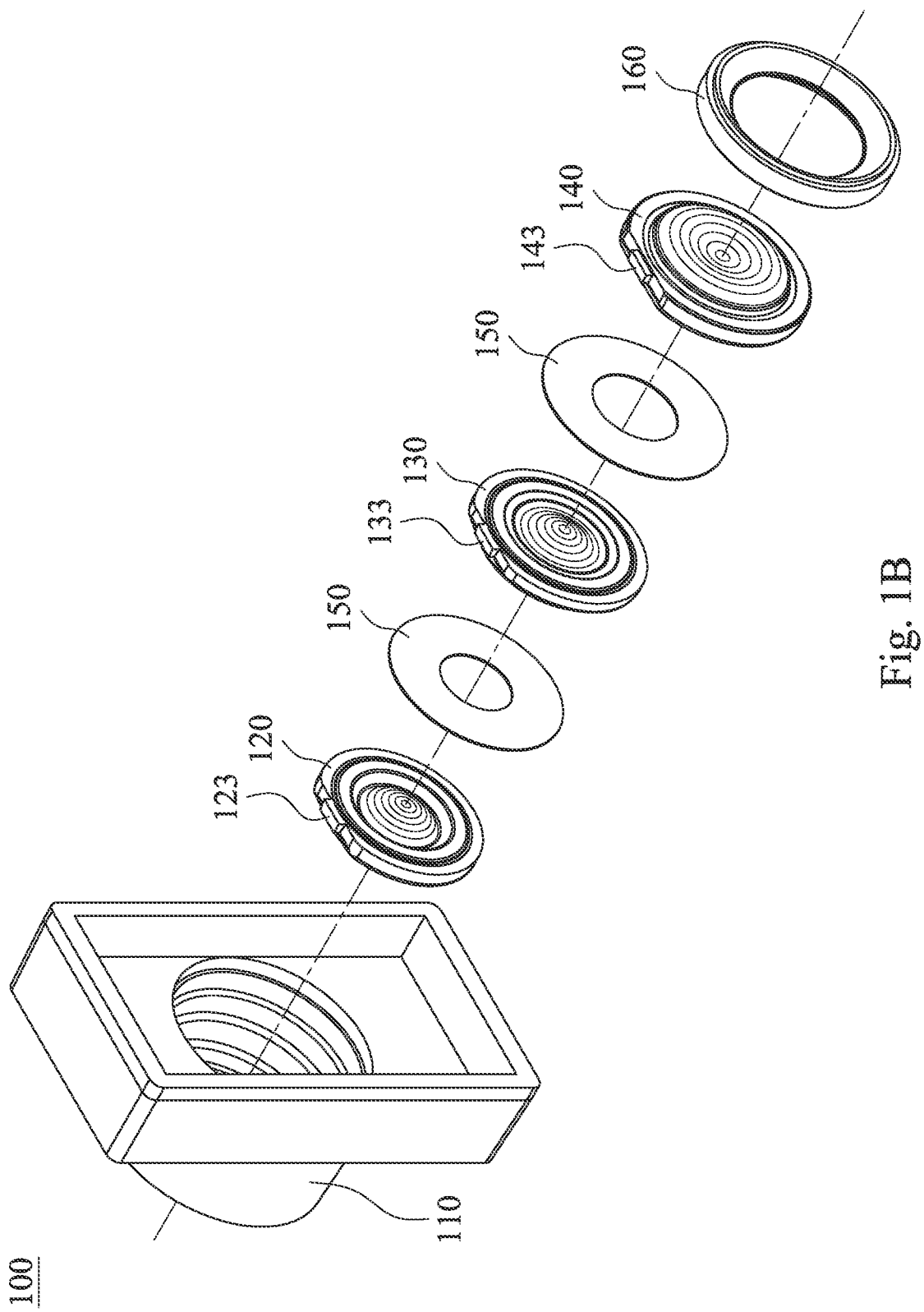
FIG. 1B shows an exploded view of the imaging lens assembly module according to the 1st embodiment in FIG. 1A.
Figure 1C:
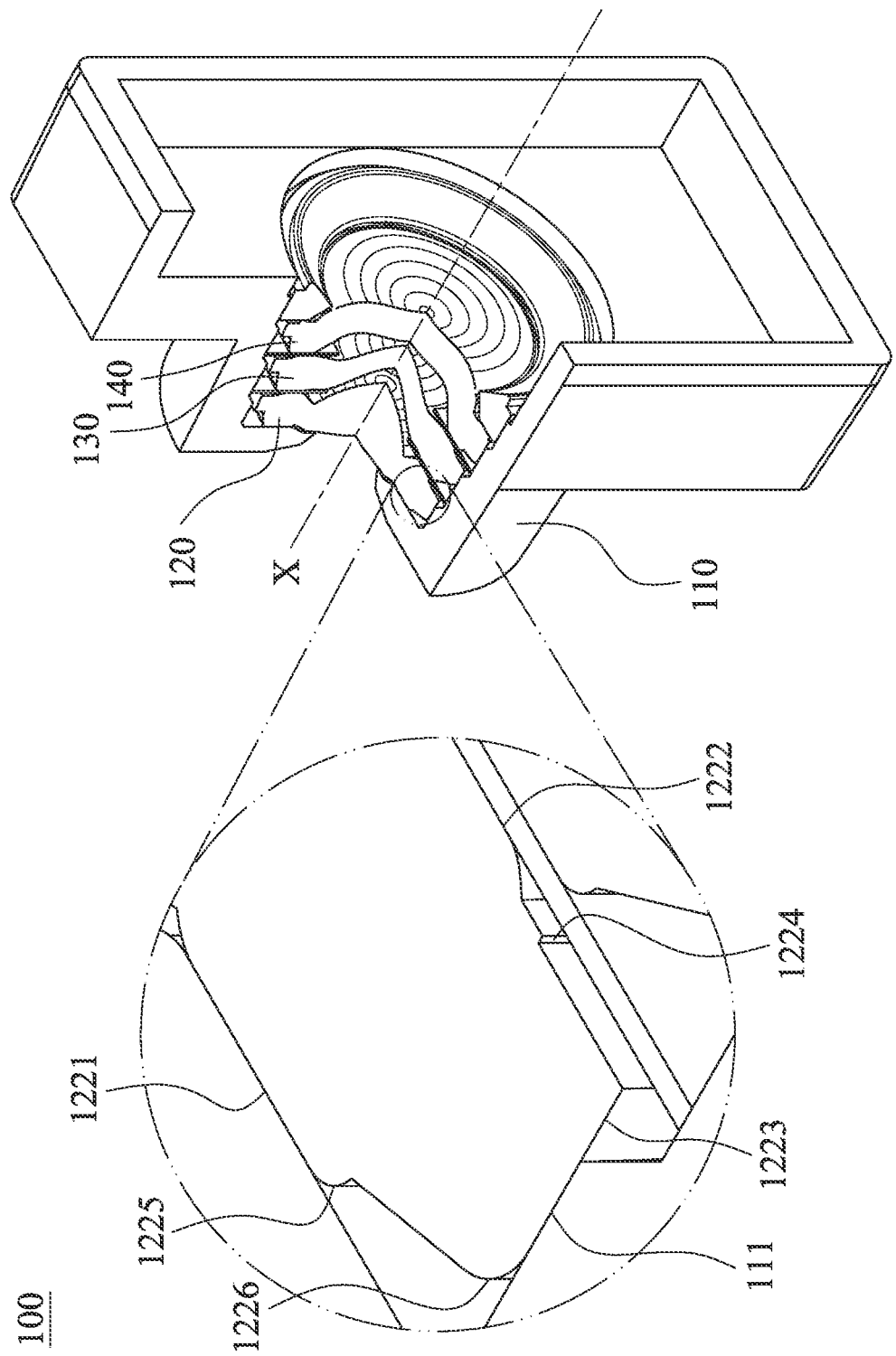
FIG. 1C shows a partial perspective view of the imaging lens assembly module according to the 1st embodiment in FIG. 1A.
Figure 1D:
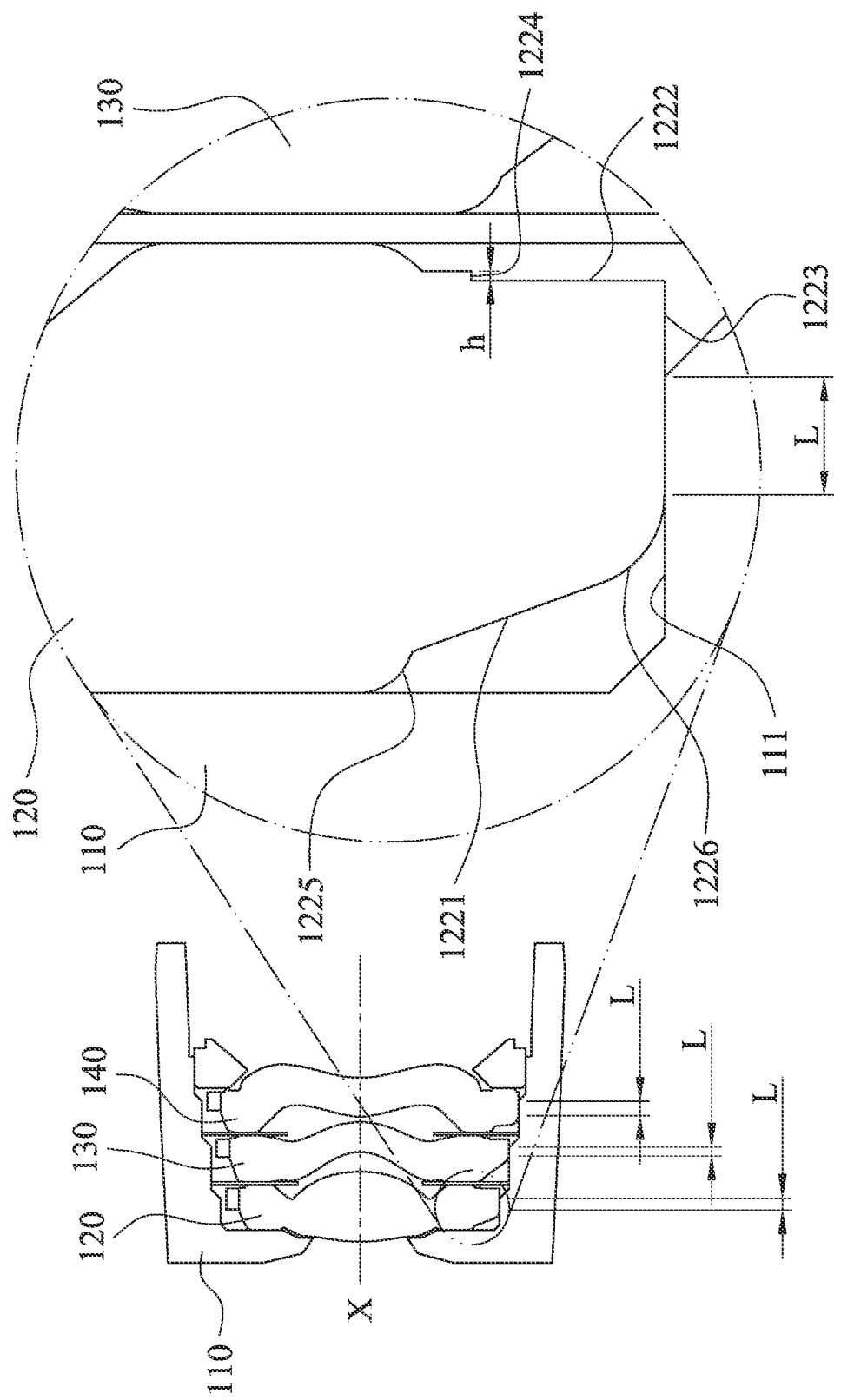
FIG. 1D shows a schematic view of the imaging lens assembly module according to the 1st embodiment in FIG. 1A.

FIG. 1A shows a three-dimensional schematic view of an imaging lens assembly module 100 according to the 1st embodiment of the present disclosure. FIG. 1B shows an exploded view of the imaging lens assembly module 100 according to the 1st embodiment in FIG. 1A. FIG. 1C shows a partial perspective view of the imaging lens assembly module 100 according to the 1st embodiment in FIG. 1A. FIG. 1D shows a schematic view of the imaging lens assembly module 100 according to the 1st embodiment in FIG. 1A. As shown in FIGS. 1A-1D, the imaging lens assembly module 100 includes a lens barrel 110 and an imaging lens assembly (its reference numeral is omitted). The lens barrel 110 has a plurality of inner surfaces 111 and forming an inner space (its reference numeral is omitted). The imaging lens assembly is disposed in the inner space of the lens barrel 110, and the imaging lens assembly has an optical axis X and includes at least one lens element. Specifically, the imaging lens assembly includes three lens elements. The three lens elements are a first lens element 120, a second lens element 130 and a third lens element 140, respectively, but the present disclosure is not limited thereto.

The imaging lens assembly can further include two light blocking elements 150 and a retainer 160. Each of the two light blocking elements 150 is disposed between the first lens element 120 and the second lens element 130, and between the second lens element 130 and the third lens element 140, respectively. The retainer 160 is disposed on an image-side of the third lens element 140. Other optical elements can be assembled to the imaging lens assembly according to the optical requirements, but the present disclosure is not limited thereto.

Figure 1E:
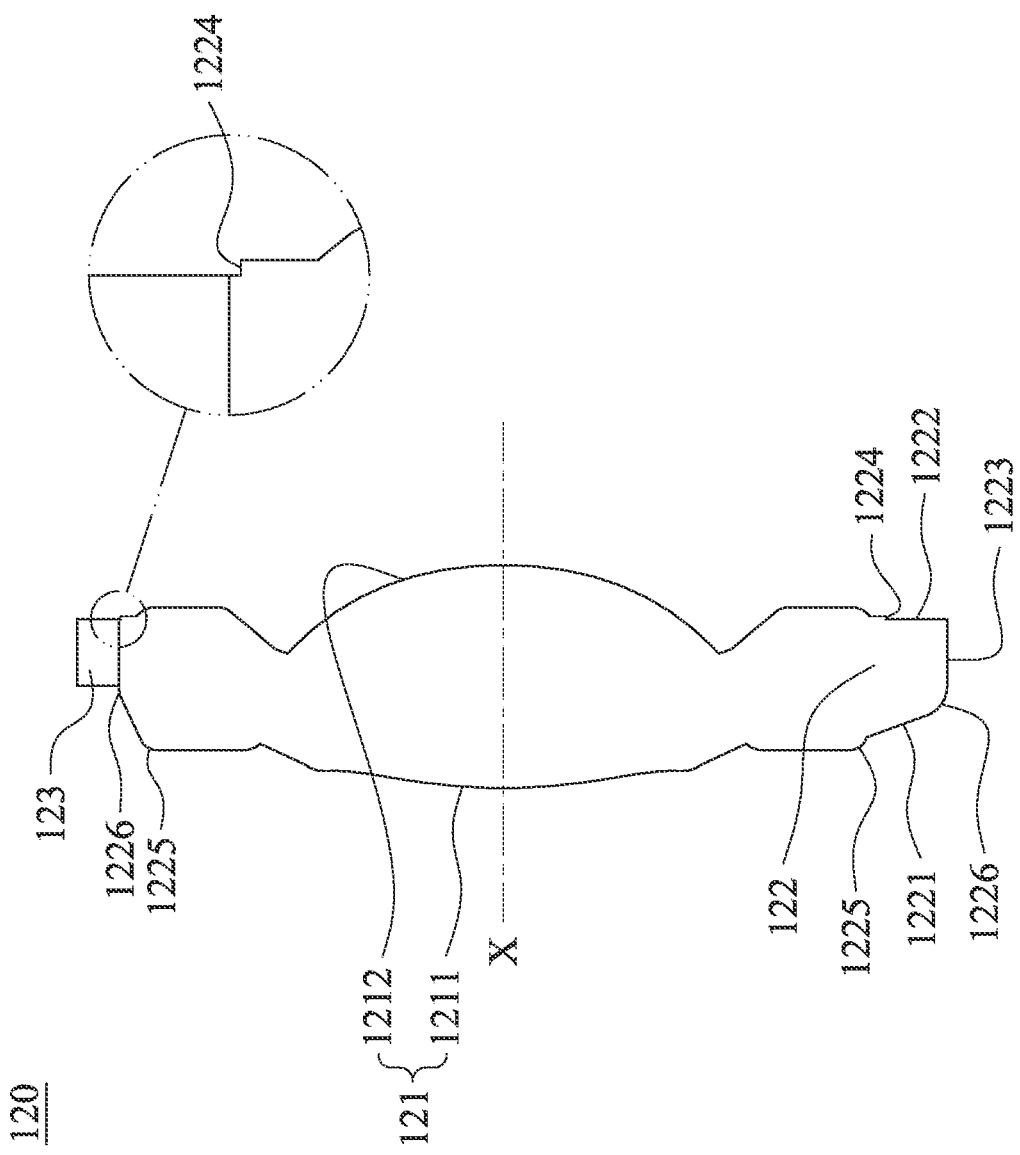
FIG. 1E shows a schematic view of the first lens element according to the 1st embodiment in FIG. 1D.
Figure 1F:
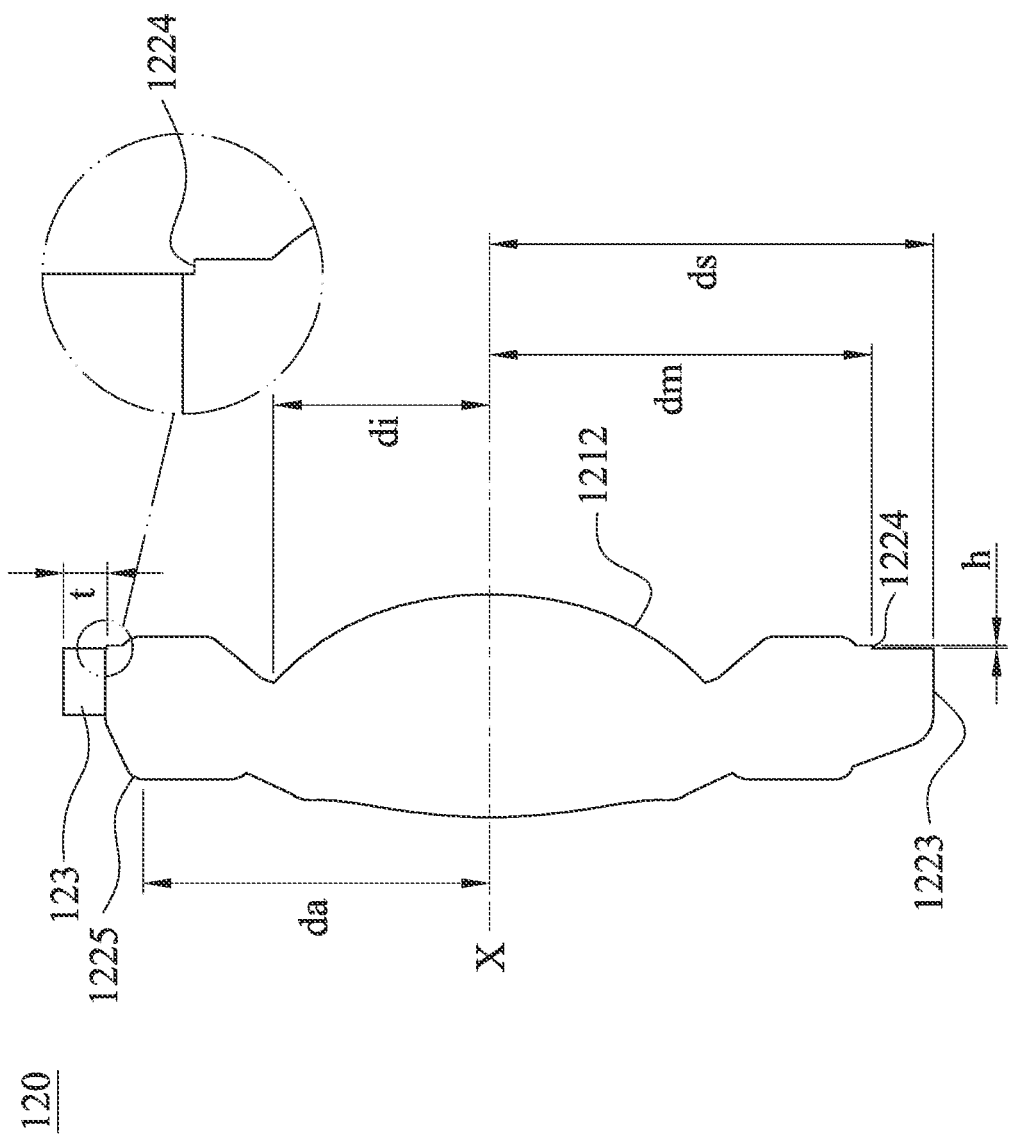
FIG. 1F shows a schematic view of parameters of the first lens element according to the 1st embodiment in FIG. 1E.

FIG. 1E shows a schematic view of the first lens element 120 according to the 1st embodiment in FIG. 1D. FIG. 1F shows a schematic view of parameters of the first lens element 120 according to the 1st embodiment in FIG. 1E. As shown in FIGS. 1C-1F, the first lens element 120 includes an optical effective region 121 and a peripheral portion 122. The optical axis X passes through the optical effective region 121, and the peripheral portion 122 surrounds the optical effective region 121. The peripheral portion 122 includes an object-side surface 1221, an image-side surface 1222, a peripheral surface 1223, an annular marking structure 1224 and two arc portions 1225, 1226. The object-side surface 1221 faces towards an object side, and the image-side surface 1222 faces towards an image side and corresponds to the object-side surface 1221. The peripheral surface 1223 connects the object-side surface 1221 and the image-side surface 1222, and contacts one of the inner surfaces 111 of the lens barrel 110 physically. The annular marking structure 1224 is disposed on one of the object-side surface 1221 and the image-side surface 1222, and the annular marking structure 1224 is an annular tip-ended protruding structure and surrounds the optical axis X. The two arc portions 1225, 1226 are disposed on the other one of the object-side surface 1221 and the image-side surface 1222, and each of the two arc portions 1225, 1226 is an annular protruding arc. In the 1st embodiment, the annular marking structure 1224 is disposed on the image-side surface 1222, and the two arc portions 1225, 1226 are disposed on the object-side surface 1221.

Specifically, the optical effective region 121 can include an object-side optical surface 1211 and an image-side optical surface 1212. The object-side optical surface 1211 faces towards the object side, the image-side optical surface 1212 faces towards the image side, and at least one of the object-side optical surface 1211 and the image-side optical surface 1212 is an optical aspheric surface. In the 1st embodiment, both of the object-side optical surface 1211 and the image-side optical surface 1212 are optical aspheric surfaces.

Moreover, please refer to FIG. 1B, the first lens element 120 can be formed by injection molding and can further include at least one gate trace 123. In the 1st embodiment, a number of the gate trace 123 of the first lens element 120 is one, and the gate trace 123 is disposed on the peripheral surface 1223 of the first lens element 120.

As shown in FIGS. 1D-1F, in the first lens element 120, when a length of a region which the peripheral surface 1223 contacts the one of the inner surfaces 111 along a direction parallel to the optical axis X is L, a protruding height of the annular marking structure 1224 is h, a distance from the annular marking structure 1224 to the gate trace 123 along a direction perpendicular to the optical axis X is t, a perpendicular distance between the arc portion 1225 and the optical axis X is da, a perpendicular distance between the annular marking structure 1224 and the optical axis X is dm, a maximum radius of the peripheral surface 1223 is ds, and a maximum radius of the image-side optical surface 1212 is di, the conditions related to the parameters can be satisfied as the following Table 1.

TABLE 1 the first lens element 120 according to the 1st embodiment

| | | | |
|---|---|---|---|
| da (mm) | 0.585 | dm/ds | 0.861 |
| dm (mm) | 0.646 | di/dm | 0.565 |
| da/dm | 0.906 | L (mm) | 0.063 |
| ds (mm) | 0.75 | h (mm) | 0.005 |
| di (mm) | 0.365 | t (mm) | 0.074 |

In the first lens element 120, a curvature radius Ra of each of the two arc portions 1225, 1226 is 0.03 mm and 0.05 mm.

Figure 1G:
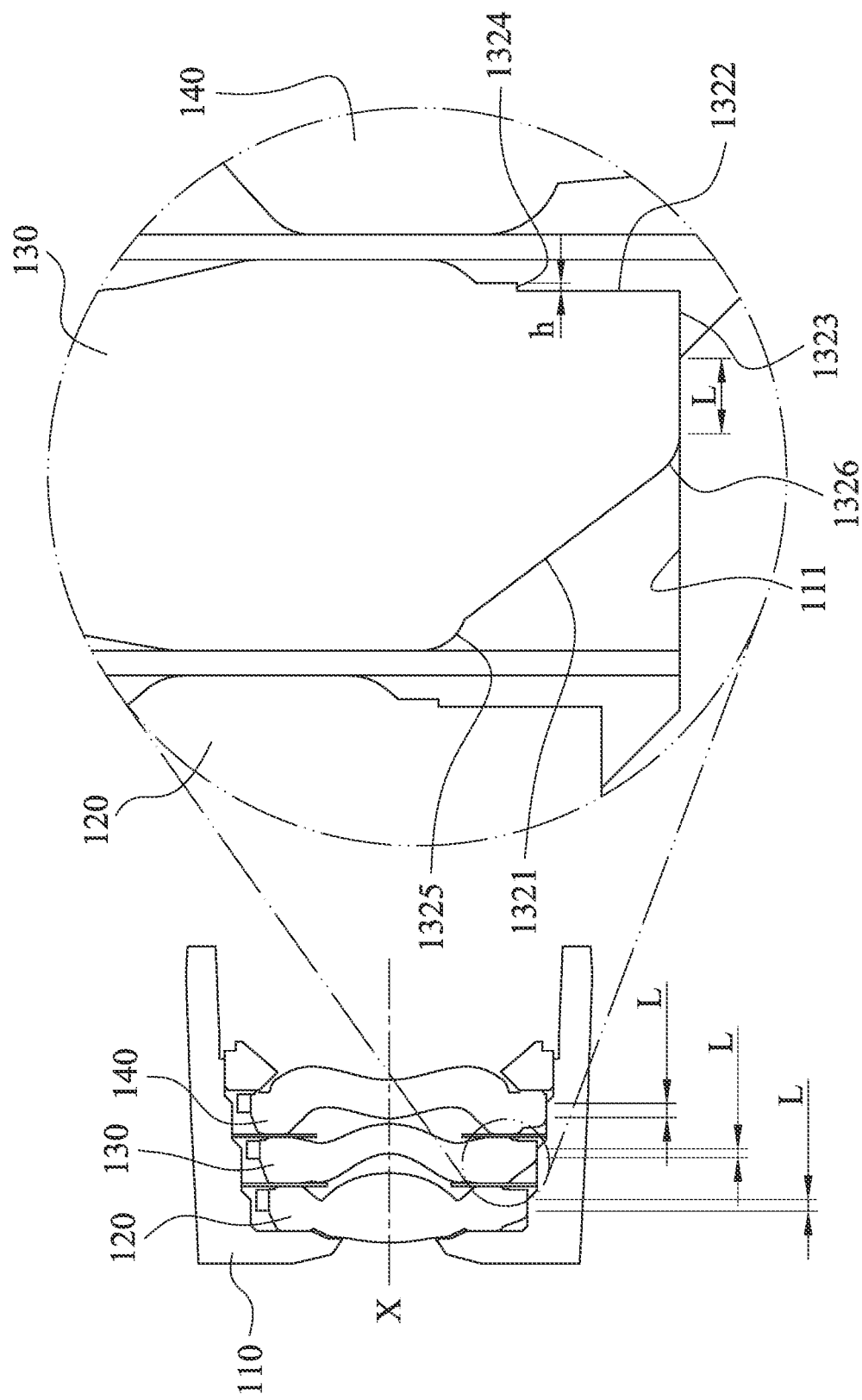
FIG. 1G shows another schematic view of the imaging lens assembly module according to the 1st embodiment in FIG. 1A.
Figure 1H:
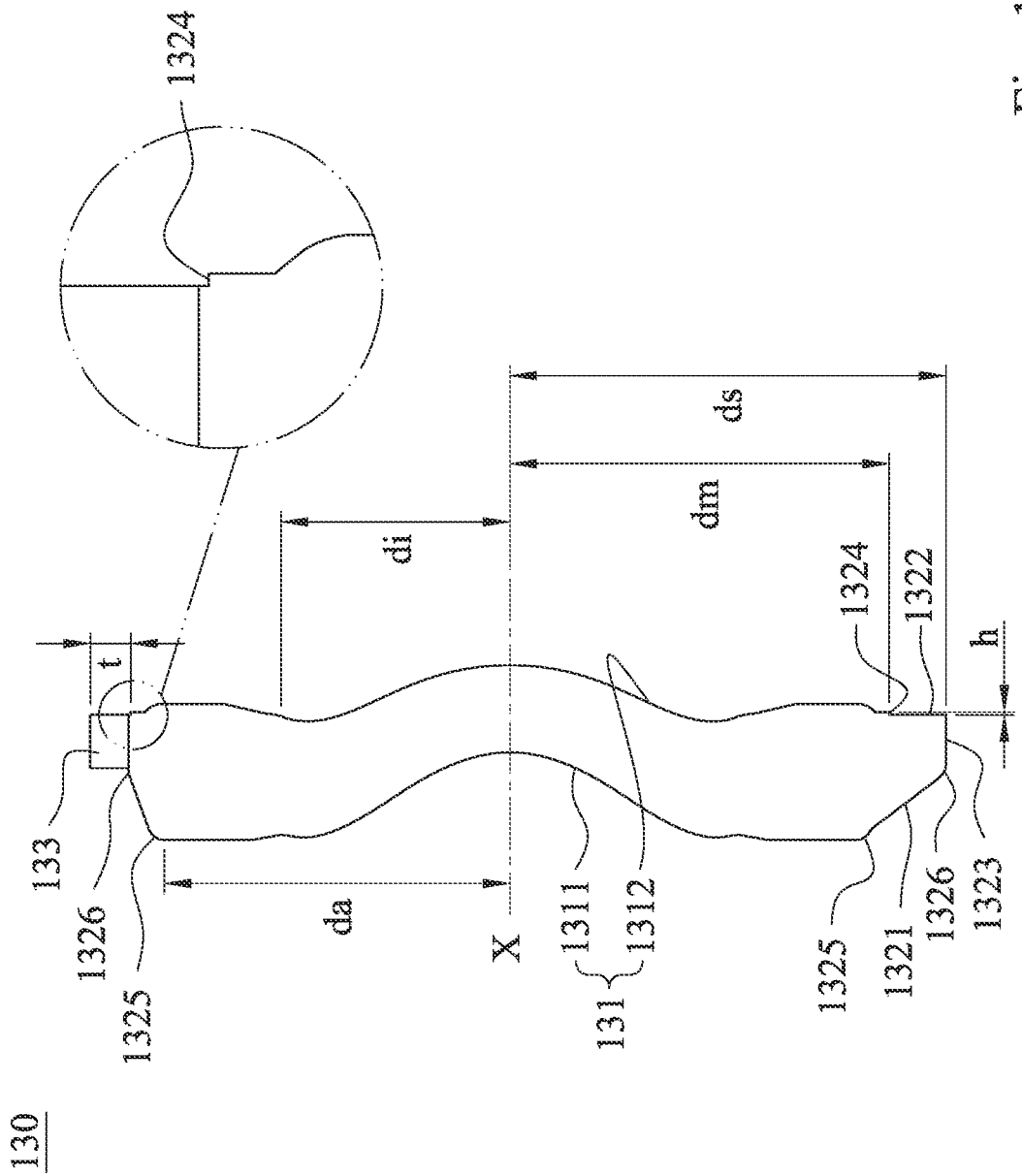
FIG. 1H shows schematic view parameters of the second lens element according to the 1st embodiment in FIG. 1G.
Figure 11:
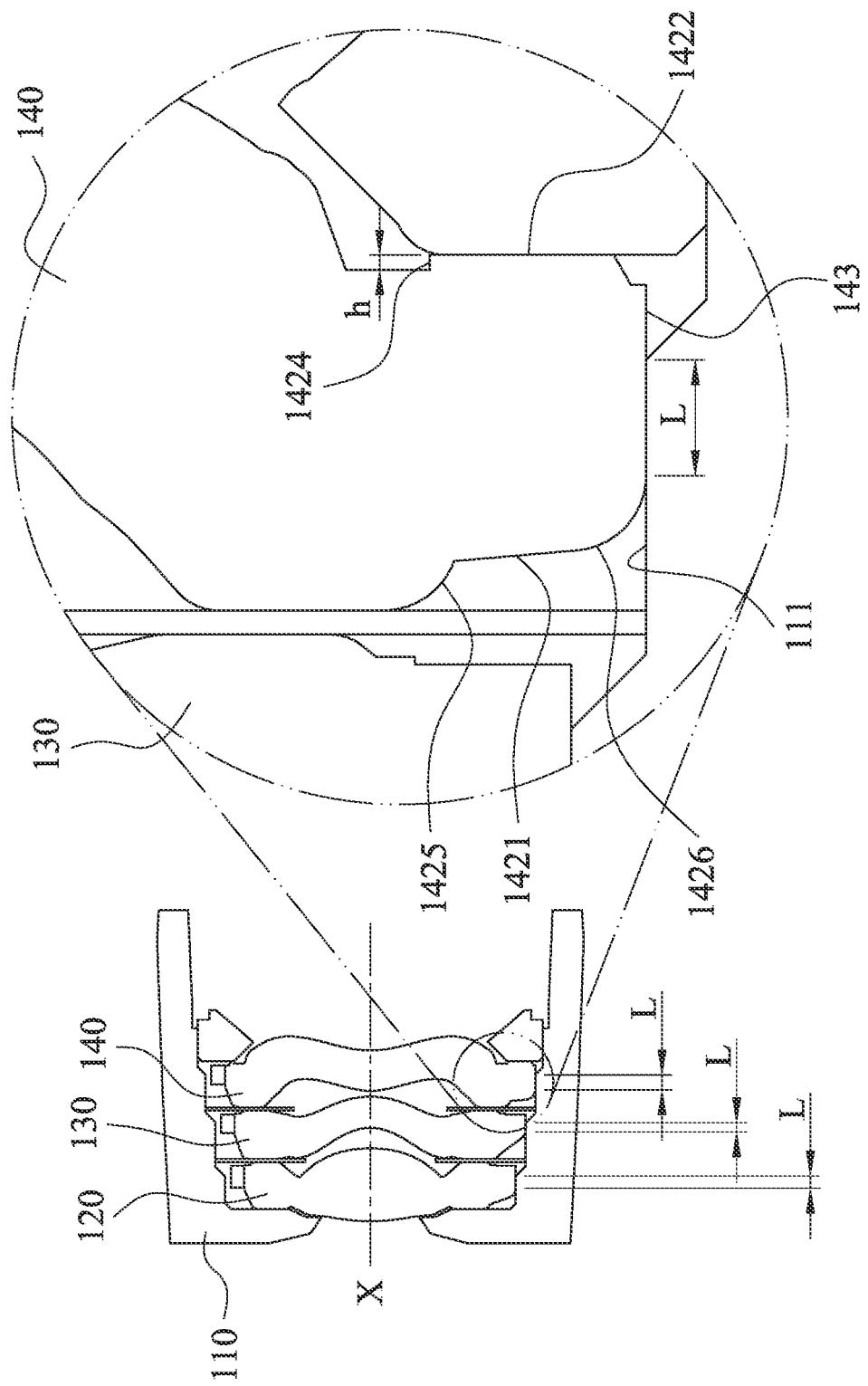

FIG. 1G shows another schematic view of the imaging lens assembly module 100 according to the 1st embodiment in FIG. 1A. FIG. 1H shows schematic view of parameters of the second lens element 130 according to the 1st embodiment in FIG. 1G. As shown in FIGS. 1G and 1H, the second lens element 130 includes an optical effective region 131 and a peripheral portion (its reference numeral is omitted). The optical axis X passes through the optical effective region 131, and the peripheral portion surrounds the optical effective region 131. The peripheral portion includes an object-side surface 1321, an image-side surface 1322, a peripheral surface 1323, an annular marking structure 1324 and two arc portions 1325, 1326. The object-side surface 1321 faces towards the object side, and the image-side surface 1322 faces towards the image side and corresponds to the object-side surface 1321. The peripheral surface 1323 connects the object-side surface 1321 and the image-side surface 1322, and contacts another one of the inner surfaces 111 of the lens barrel 110 physically. The annular marking structure 1324 is disposed on one of the object-side surface 1321 and the image-side surface 1322, and the annular marking structure 1324 is an annular tip-ended protruding structure and surrounds the optical axis X. The two arc portions 1325, 1326 are disposed on the other one of the object-side surface 1321 and the image-side surface 1322, and each of the two arc portions 1325, 1326 is an annular protruding arc. In the 1st embodiment, the annular marking structure 1324 is disposed on the image-side surface 1322, and the two arc portions 1325, 1326 are disposed on the object-side surface 1321.

Specifically, the optical effective region 131 can include an object-side optical surface 1311 and an image-side optical surface 1312. The object-side optical surface 1311 faces towards the object side, the image-side optical surface 1312 faces towards the image side, and at least one of the object-side optical surface 1311 and the image-side optical surface 1312 is an optical aspheric surface. In the 1st embodiment, both of the object-side optical surface 1311 and the image-side optical surface 1312 are optical aspheric surfaces.

Moreover, please refer to FIG. 1B, the second lens element 130 can be formed by injection molding and can further include at least one gate trace 133. In the 1st embodiment, a number of the gate trace 133 of the second lens element 130 is one, and the gate trace 133 is disposed on the peripheral surface 1323 of the second lens element 130.

As shown in FIGS. 1G and 1H, in the second lens element 130, when a length of a region which the peripheral surface 1323 contacts the another one of the inner surfaces 111 along a direction parallel to the optical axis X is L, a protruding height of the annular marking structure 1324 is h, a distance from the annular marking structure 1324 to the gate trace 133 along a direction perpendicular to the optical axis X is t, a perpendicular distance between the arc portion 1325 and the optical axis X is da, a perpendicular distance between the annular marking structure 1324 and the optical axis X is dm, a maximum radius of the peripheral surface 1323 is ds, and a maximum radius of the image-side optical surface 1312 is di, the conditions related to the parameters can be satisfied as the following Table 2.

TABLE 2 the second lens element 130 according to the 1st embodiment

| | | | |
|---|---|---|---|
| da (mm) | 0.634 | dm/ds | 0.87 |
| dm (mm) | 0.696 | di/dm | 0.603 |
| da/dm | 0.911 | L (mm) | 0.048 |
| ds (mm) | 0.8 | h (mm) | 0.005 |
| di (mm) | 0.42 | t (mm) | 0.074 |

In the second lens element 130, a curvature radius Ra of each of the two arc portions 1325, 1326 is 0.03 mm.

FIG. 1I shows another schematic view of the imaging lens assembly module 100 according to the 1st embodiment in FIG. 1A. FIG. 1J shows schematic view of parameters of the third lens element 140 according to the 1st embodiment in FIG. 1I. As shown in FIGS. 1I and 1J, the third lens element 140 includes an optical effective region 141 and a peripheral portion (its reference numeral is omitted). The optical axis X passes through the optical effective region 141, and the peripheral portion surrounds the optical effective region 141. The peripheral portion includes an object-side surface 1421, an image-side surface 1422, a peripheral surface 1423, an annular marking structure 1424 and two arc portions 1425, 1426. The object-side surface 1421 faces towards the object side, and the image-side surface 1422 faces towards the image side and corresponds to the object-side surface 1421. The peripheral surface 1423 connects the object-side surface 1421 and the image-side surface 1422, and contacts the other one of the inner surfaces 111 of the lens barrel 110 physically. The annular marking structure 1424 is disposed on one of the object-side surface 1421 and the image-side surface 1422, and the annular marking structure 1424 is an annular tip-ended protruding structure and surrounds the optical axis X. The two arc portions 1425, 1426 are disposed on the other one of the object-side surface 1421 and the image-side surface 1422, and each of the two arc portions 1425, 1426 is an annular protruding arc. In the 1st embodiment, the annular marking structure 1424 is disposed on the image-side surface 1422, and the two arc portions 1425, 1426 are disposed on the object-side surface 1421.

Specifically, the optical effective region 141 can include an object-side optical surface 1411 and an image-side optical surface 1412. The object-side optical surface 1411 faces towards the object side, the image-side optical surface 1412 faces towards the image side, and at least one of the object-side optical surface 1411 and the image-side optical surface 1412 is an optical aspheric surface. In the 1st embodiment, both of the object-side optical surface 1411 and the image-side optical surface 1412 are optical aspheric surfaces.

Moreover, please refer to FIG. 1B, the third lens element 140 can be formed by injection molding and can further include at least one gate trace 143. In the 1st embodiment, a number of the gate trace 143 of the third lens element 140 is one, and the gate trace 143 is disposed on the peripheral surface 1423 of the third lens element 140.

As shown in FIGS. 1I and 1J, in the third lens element 140, when a length of a region which the peripheral surface 1423 contacts the aforementioned other one of the inner surfaces 111 along a direction parallel to the optical axis X is L, a protruding height of the annular marking structure 1424 is h, a distance from the annular marking structure 1424 to the gate trace 143 along a direction perpendicular to the optical axis X is t, a perpendicular distance between the arc portion 1425 and the optical axis X is da, a perpendicular distance between the annular marking structure 1424 and the optical axis X is dm, a maximum radius of the peripheral surface 1423 is ds, and a maximum radius of the image-side optical surface 1412 is di, the conditions related to the parameters can be satisfied as the following Table 3.

TABLE 3 the third lens element 140 according to the 1st embodiment

| da (mm) | 0.675 | dm/ds | 0.831 |
|---|---|---|---|
| dm (mm) | 0.706 | di/dm | 0.843 |
| da/dm | 0.956 | L (mm) | 0.077 |
| ds (mm) | 0.85 | h (mm) | 0.005 |
| di (mm) | 0.595 | t (mm) | 0.114 |

In the third lens element 140, a curvature radius Ra of each of the two arc portions 1425, 1426 is 0.05 mm.

2nd Embodiment

Figure 2A:
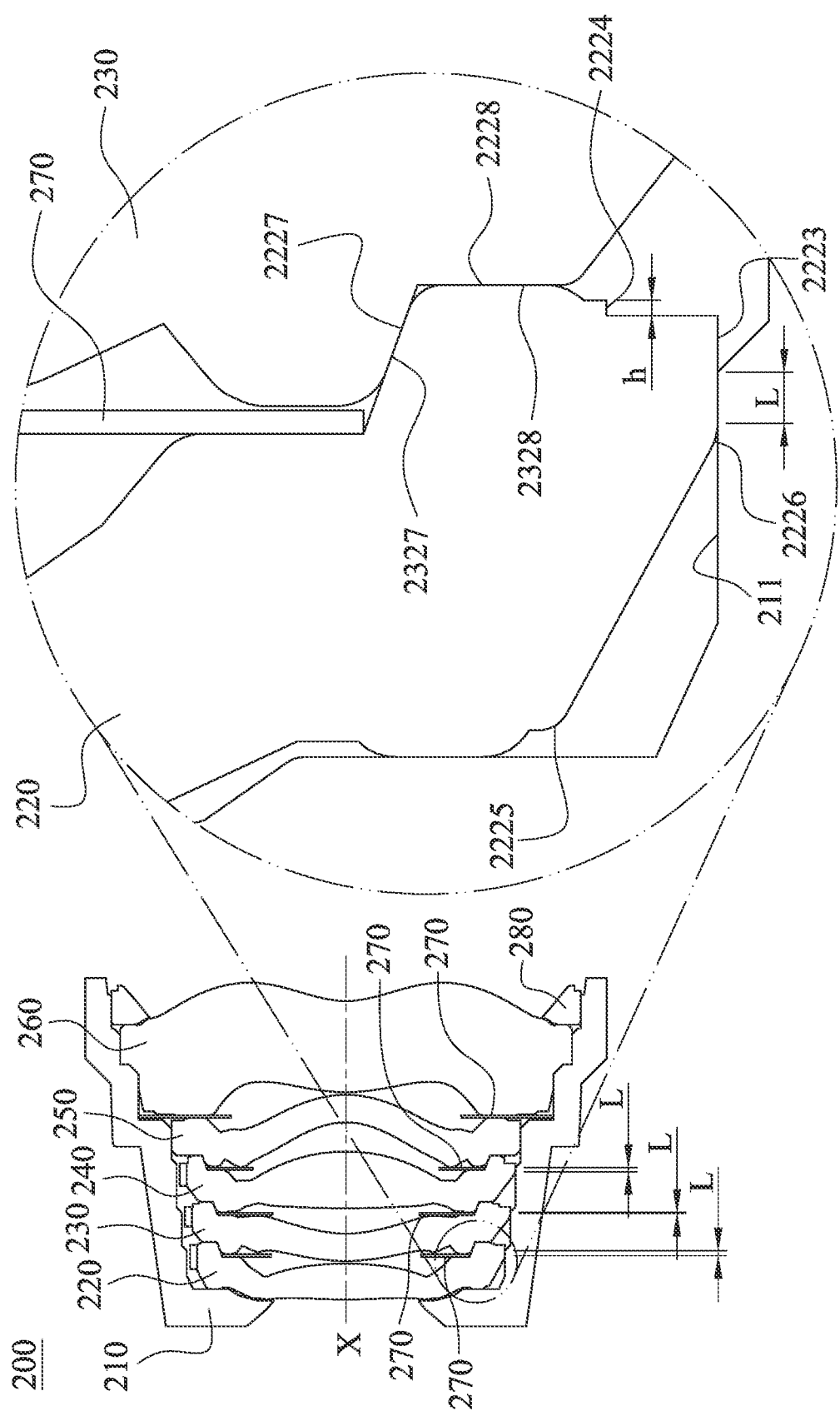
FIG. 2A shows a schematic view of an imaging lens assembly module according to the 2nd embodiment of the present disclosure.

FIG. 2A shows a schematic view of an imaging lens assembly module 200 according to the 2nd embodiment of the present disclosure. As shown in FIG. 2A, the imaging lens assembly module 200 includes a lens barrel 210 and an imaging lens assembly (its reference numeral is omitted). The lens barrel 210 has a plurality of inner surfaces 211 and forming an inner space (its reference numeral is omitted). The imaging lens assembly is disposed in the inner space of the lens barrel 210, and the imaging lens assembly has an optical axis X and includes a first lens element 220, a second lens element 230, a third lens element 240 and two optical lens elements 250, 260.

The imaging lens assembly can further include four light blocking elements 270 and a retainer 280. Each of the four light blocking elements 270 is disposed between the first lens element 220 and the second lens element 230, between the second lens element 230 and the third lens element 240, between the third lens element 240 and the optical lens element 250, and between the two optical lens elements 250, 260, respectively. The retainer 280 is disposed on an image-side of the optical lens element 260. Other optical elements can be assembled to the imaging lens assembly according to the optical requirements, but the present disclosure is not limited thereto.

Figure 2B:
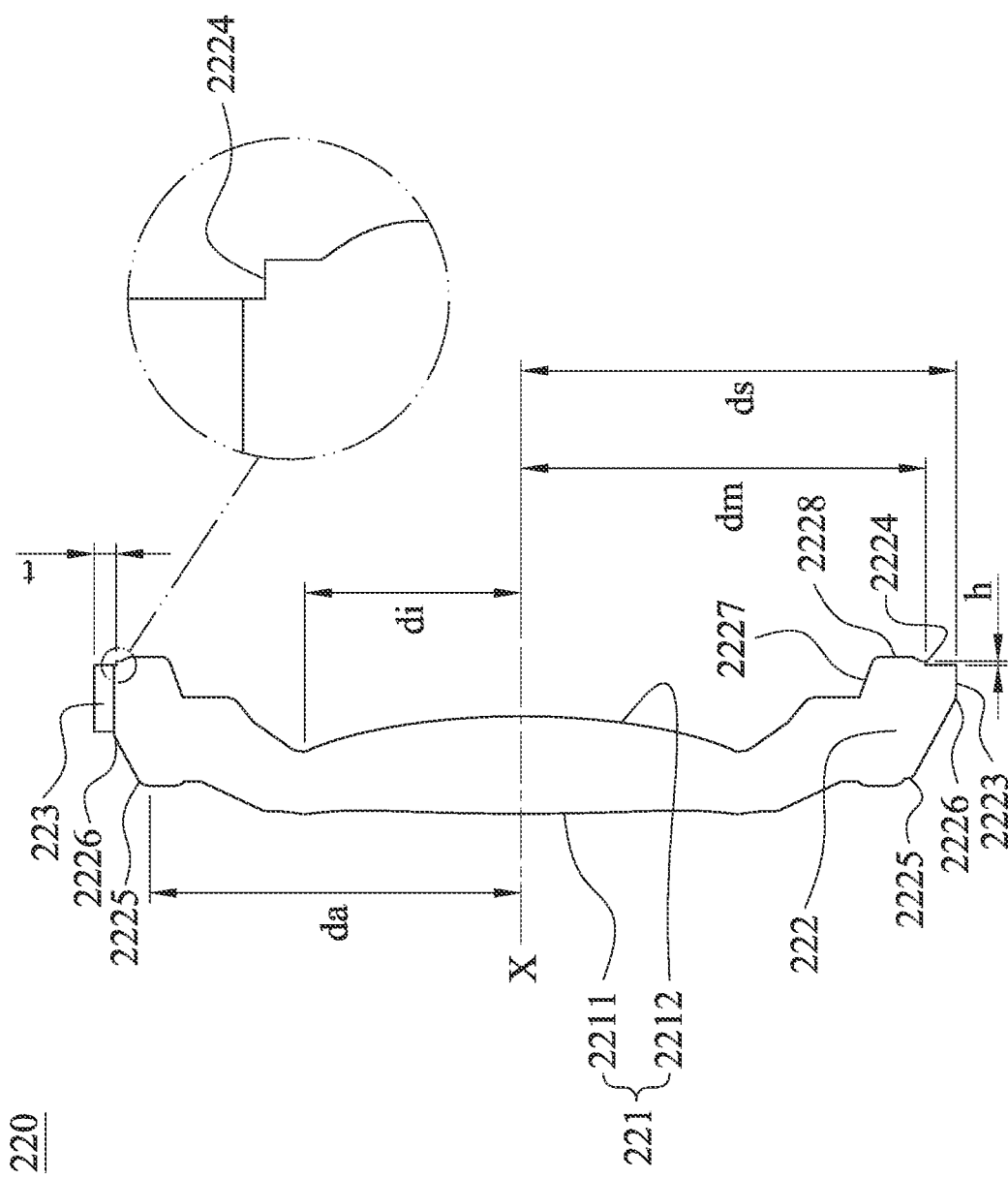
FIG. 2B shows a schematic view of parameters of the first lens element according to the 2nd embodiment in FIG. 2A.

FIG. 2B shows a schematic view of parameters of the first lens element 220 according to the 2nd embodiment in FIG. 2A. As shown in FIGS. 2A and 2B, the first lens element 220 includes an optical effective region 221 and a peripheral portion 222. The optical axis X passes through the optical effective region 221, and the peripheral portion 222 surrounds the optical effective region 221. The peripheral portion 222 includes an object-side surface, an image-side surface, a peripheral surface 2223, an annular marking structure 2224 and two arc portions 2225, 2226. The object-side surface faces towards an object side, and the image-side surface faces towards an image side and corresponds to the object-side surface. The peripheral surface 2223 connects the object-side surface and the image-side surface, and contacts one of the inner surfaces 211 of the lens barrel 210 physically. The annular marking structure 2224 is only disposed on the image-side surface, and the annular marking structure 2224 is an annular tip-ended protruding structure and surrounds the optical axis X. The two arc portions 2225, 2226 are disposed on the object-side surface and each of the two arc portions 2225, 2226 is an annular protruding arc.

Specifically, the optical effective region 221 can include an object-side optical surface 2211 and an image-side optical surface 2212. The object-side optical surface 2211 faces towards the object side, the image-side optical surface 2212 faces towards the image side, and at least one of the object-side optical surface 2211 and the image-side optical surface 2212 is an optical aspheric surface. In the 2nd embodiment, both of the object-side optical surface 2211 and the image-side optical surface 2212 are optical aspheric surfaces.

Moreover, the first lens element 220 can be formed by injection molding and can further include at least one gate trace 223. A number of the gate trace 223 of the first lens element 220 is one, and the gate trace 223 is disposed on the peripheral surface 2223 of the first lens element 220. Hence, the precision lens element with high accuracy and compactness can be provided.

As shown in FIGS. 2A and 2B, the image-side surface of the first lens element 220 can include an axial aligning structure (its reference numeral is omitted) for abutting against and aligning at center of the adjacent second lens element 230. Hence, the yield rate of assembling can be improved so as to provide better image quality. Specifically, the axial aligning structure can include a tilt surface 2227 and a flat surface 2228, and the tilt surface 2227 and the flat surface 2228 are for reducing tilting and shifting between the first lens element 220 and the second lens element 230 so as to align at center.

In the first lens element 220, when a length of a region which the peripheral surface 2223 contacts the one of the inner surfaces 211 along a direction parallel to the optical axis X is L, a protruding height of the annular marking structure 2224 is h, a distance from the annular marking structure 2224 to the gate trace 223 along a direction perpendicular to the optical axis X is t, a perpendicular distance between the arc portion 2225 and the optical axis X is da, a perpendicular distance between the annular marking structure 2224 and the optical axis X is dm, a maximum radius of the peripheral surface 2223 is ds, and a maximum radius of the image-side optical surface 2212 is di, the conditions related to the parameters can be satisfied as the following Table 4.

TABLE 4 the first lens element 220 according to the 2nd embodiment

| | | | |
|---|---|---|---|
| da (mm) | 1.322 | dm/ds | 0.93 |
| dm (mm) | 1.442 | di/dm | 0.534 |
| da/dm | 0.917 | L (mm) | 0.05 |
| ds (mm) | 1.55 | h (mm) | 0.015 |
| di (mm) | 0.77 | t (mm) | 0.079 |

In the first lens element 220, a curvature radius Ra of each of the two arc portions 2225, 2226 is 0.05 mm.

Figure 2C:
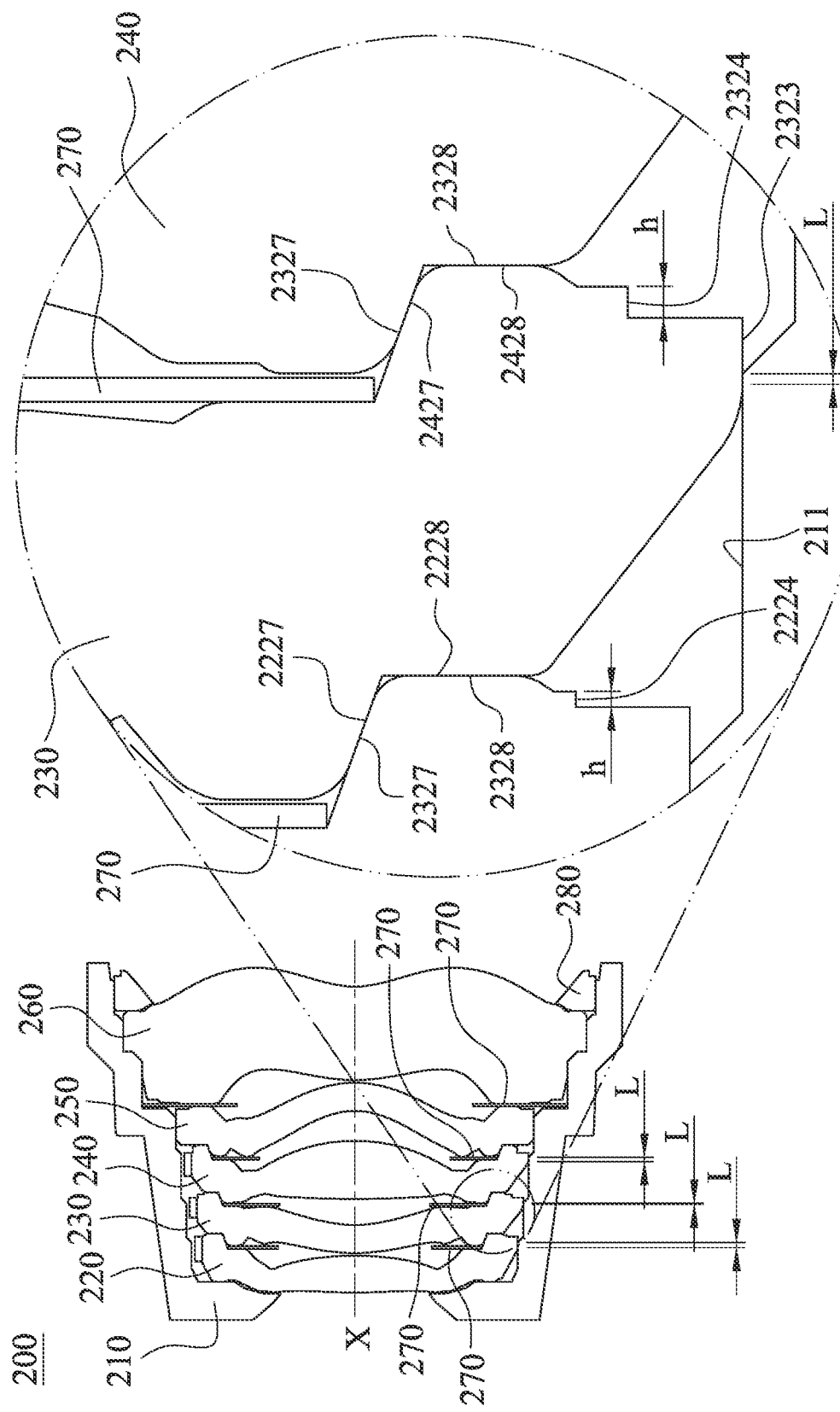
FIG. 2C shows another schematic view of the imaging lens assembly module according to the 2nd embodiment in FIG. 2A.
Figure 2D:
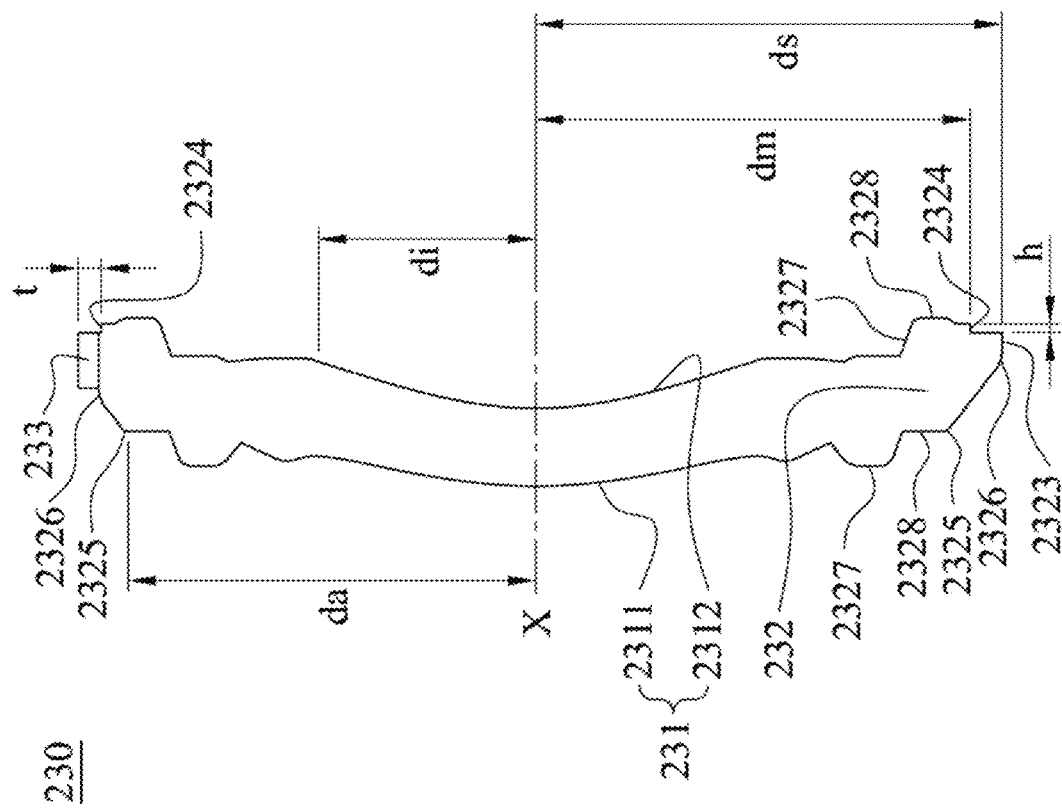
FIG. 2D shows a schematic view of parameters of the second lens element according to the 2nd embodiment in FIG. 2C.

FIG. 2C shows another schematic view of the imaging lens assembly module 200 according to the 2nd embodiment in FIG. 2A. FIG. 2D shows a schematic view of parameters of the second lens element 230 according to the 2nd embodiment in FIG. 2C. As shown in FIGS. 2C and 2D, the second lens element 230 includes an optical effective region 231 and a peripheral portion 232. The optical axis X passes through the optical effective region 231, and the peripheral portion 232 surrounds the optical effective region 231. The peripheral portion 232 includes an object-side surface, an image-side surface, a peripheral surface 2323, an annular marking structure 2324 and two arc portions 2325, 2326. The object-side surface faces towards the object side, and the image-side surface faces towards the image side and corresponds to the object-side surface. The peripheral surface 2323 connects the object-side surface and the image-side surface, and contacts another one of the inner surfaces 211 of the lens barrel 210 physically. The annular marking structure 2324 is only disposed on the image-side surface, and the annular marking structure 2324 is an annular tip-ended protruding structure and surrounds the optical axis X. The two arc portions 2325, 2326 are disposed on the object-side surface and each of the two arc portions 2325, 2326 is an annular protruding arc.

Specifically, the optical effective region 231 can include an object-side optical surface 2311 and an image-side optical surface 2312. The object-side optical surface 2311 faces towards the object side, the image-side optical surface 2312 faces towards the image side, and at least one of the object-side optical surface 2311 and the image-side optical surface 2312 is an optical aspheric surface. In the 2nd embodiment, both of the object-side optical surface 2311 and the image-side optical surface 2312 are optical aspheric surfaces.

Moreover, the second lens element 230 can be formed by injection molding and can further include at least one gate trace 233. A number of the gate trace 233 of the second lens element 230 is one, and the gate trace 233 is disposed on the peripheral surface 2323 of the second lens element 230. Hence, the precision lens element with high accuracy and compactness can be provided.

As shown in FIGS. 2C and 2D, each of the object-side surface and the image-side surface of the second lens element 230 can include an axial aligning structure (its reference numeral is omitted) for abutting against and aligning at center of the adjacent first lens element 220 and the third lens element 240, respectively. Hence, the yield rate of assembling can be improved so as to provide better image quality. Specifically, each of the axial aligning structures of the object-side surface and the image-side surface can include a tilt surface 2327 and a flat surface 2328, and the tilt surface 2327 and the flat surface 2328 are for reducing tilting and shifting between the first lens element 220 and the second lens element 230, and between the second lens element 230 and the third lens element 240, so that the function of alignment at center can be achieved. In detail, the tilt surface 2327 and the flat surface 2328 of the object-side surface of the second lens element 230 correspond to the tilt surface 2227 and the flat surface 2228 of the image-side surface of the first lens element 220, respectively.

In the second lens element 230, when a length of a region which the peripheral surface 2323 contacts the another one of the inner surfaces 211 along a direction parallel to the optical axis X is L, a protruding height of the annular marking structure 2324 is h, a distance from the annular marking structure 2324 to the gate trace 233 along a direction perpendicular to the optical axis X is t, a perpendicular distance between the arc portion 2325 and the optical axis X is da, a perpendicular distance between the annular marking structure 2324 and the optical axis X is dm, a maximum radius of the peripheral surface 2323 is ds, and a maximum radius of the image-side optical surface 2312 is di, the conditions related to the parameters can be satisfied as the following Table 5.

TABLE 5 the second lens element 230 according to the 2nd embodiment

| | | | |
|---|---|---|---|
| da (mm) | 1.399 | dm/ds | 0.932 |
| dm (mm) | 1.491 | di/dm | 5.00 |
| da/dm | 0.938 | L (mm) | 0.01 |
| ds (mm) | 1.6 | h (mm) | 0.03 |
| di (mm) | 0.745 | t (mm) | 0.079 |

In the second lens element 230, a curvature radius Ra of each of the two arc portions 2325, 2326 is 0.025 mm and 0.1 mm.

Figure 2E:
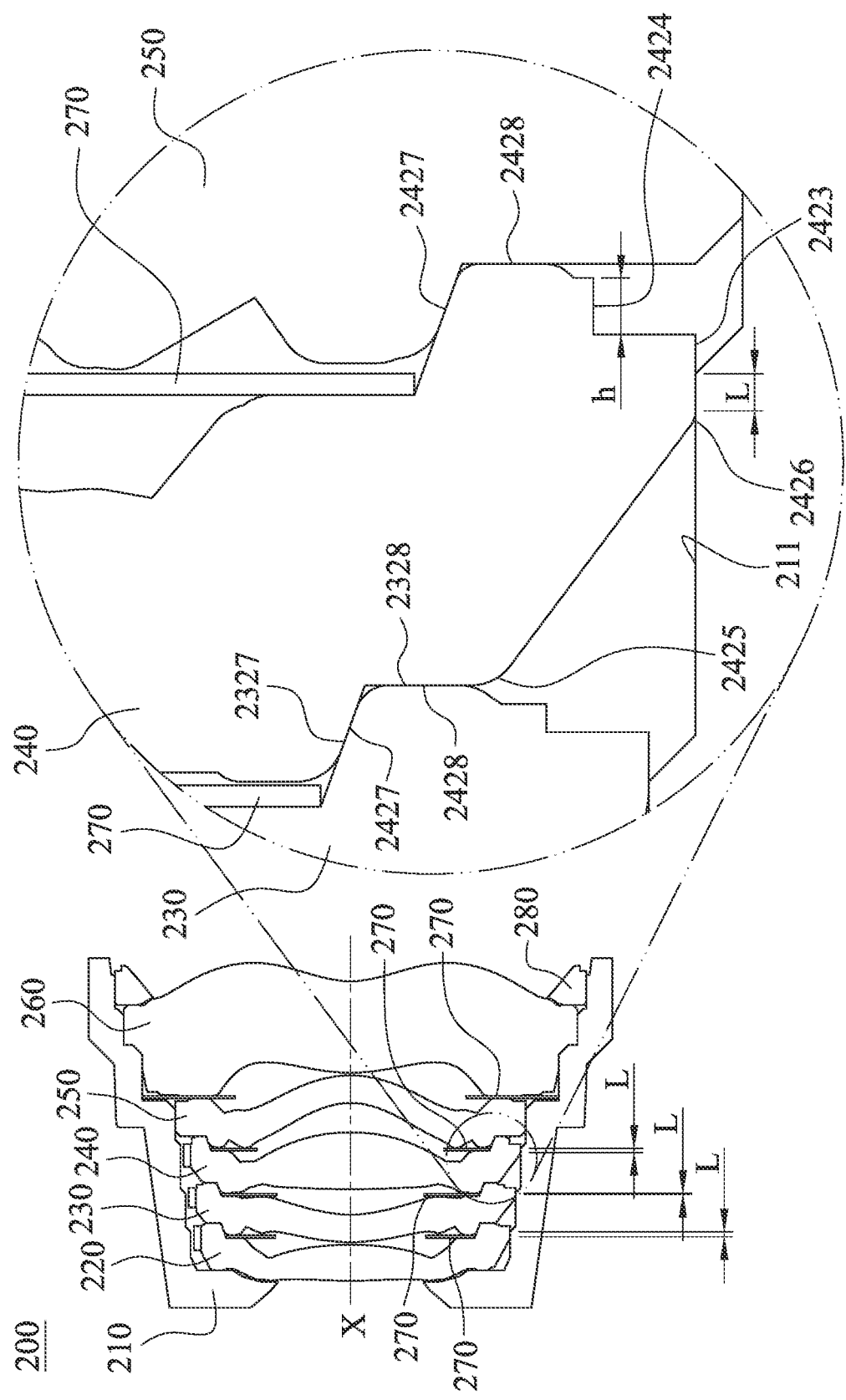
FIG. 2E shows another schematic view of the imaging lens assembly module according to the 2nd embodiment in FIG. 2A.
Figure 2F:
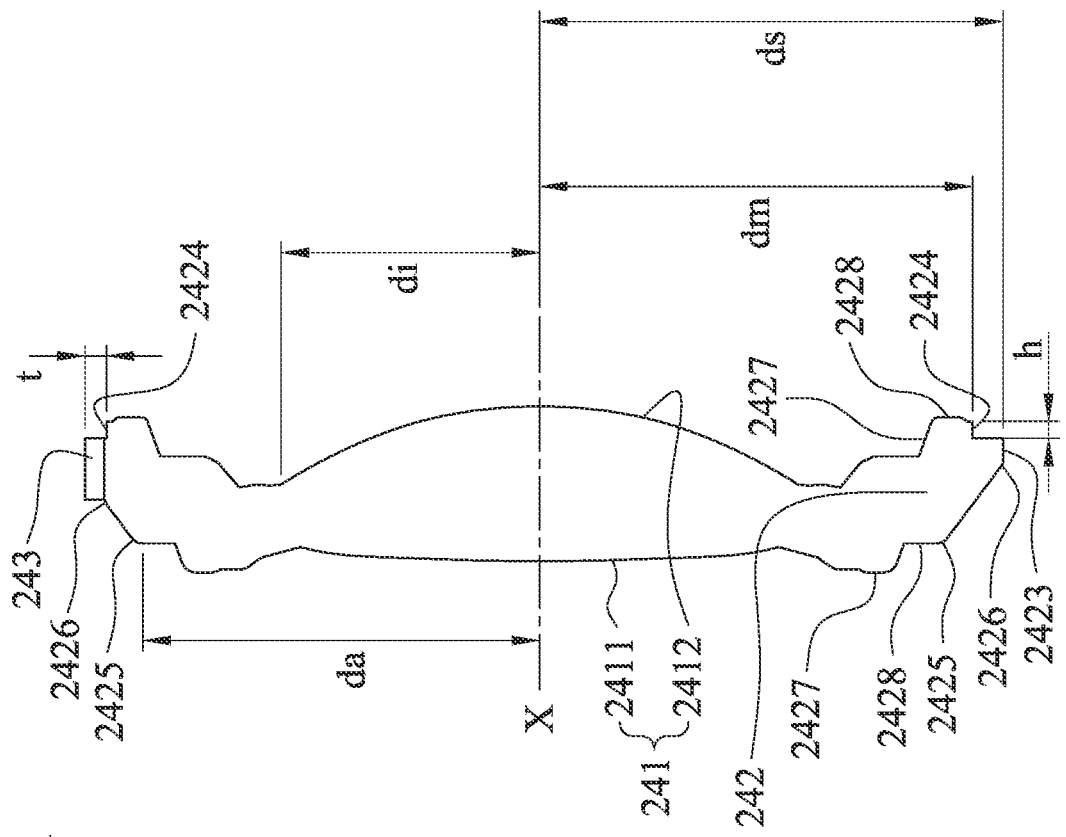
FIG. 2F shows a schematic view of parameters of the third lens element according to the 2nd embodiment in FIG. 2E.

FIG. 2E shows another schematic view of the imaging lens assembly module 200 according to the 2nd embodiment in FIG. 2A. FIG. 2F shows a schematic view of parameters of the third lens element 240 according to the 2nd embodiment in FIG. 2E. As shown in FIGS. 2E and 2F, the third lens element 240 includes an optical effective region 241 and a peripheral portion 242. The optical axis X passes through the optical effective region 241, and the peripheral portion 242 surrounds the optical effective region 241. The peripheral portion 242 includes an object-side surface, an image-side surface, a peripheral surface 2423, an annular marking structure 2424 and two arc portions 2425, 2426. The object-side surface faces towards the object side, and the image-side surface faces towards the image side and corresponds to the object-side surface. The peripheral surface 2423 connects the object-side surface and the image-side surface, and contacts the other one of the inner surfaces 211 of the lens barrel 210 physically. The annular marking structure 2424 is only disposed on the image-side surface, and the annular marking structure 2424 is an annular tip-ended protruding structure and surrounds the optical axis X. The two arc portions 2425, 2426 are disposed on the object-side surface and each of the two arc portions 2425, 2426 is an annular protruding arc.

Specifically, the optical effective region 241 can include an object-side optical surface 2411 and an image-side optical surface 2412. The object-side optical surface 2411 faces towards the object side, the image-side optical surface 2412 faces towards the image side, and at least one of the object-side optical surface 2411 and the image-side optical surface 2412 is an optical aspheric surface. In the 2nd embodiment, both of the object-side optical surface 2411 and the image-side optical surface 2412 are optical aspheric surfaces.

Moreover, the third lens element 240 can be formed by injection molding and can further include at least one gate trace 243. A number of the gate trace 243 of the third lens element 240 is one, and the gate trace 243 is disposed on the peripheral surface 2423 of the third lens element 240. Hence, the precision lens element with high accuracy and compactness can be provided.

As shown in FIGS. 2E and 2F, each of the object-side surface and the image-side surface of the third lens element 240 can include an axial aligning structure (its reference numeral is omitted) for abutting against and aligning at center of the adjacent second lens element 230 and the optical lens element 250, respectively. Hence, the yield rate of assembling can be improved so as to provide better image quality. Specifically, each of the axial aligning structures of the object-side surface and the image-side surface can include a tilt surface 2427 and a flat surface 2428, and the tilt surface 2427 and the flat surface 2428 are for reducing tilting and shifting between the second lens element 230 and the third lens element 240, and between the third lens element 240 and the optical lens element 250, so that the function of alignment at center can be achieved. In detail, the tilt surface 2427 and the flat surface 2428 of the object-side surface of the third lens element 240 correspond to the tilt surface 2327 and the flat surface 2328 of the image-side surface of the second lens element 230, respectively.

In the third lens element 240, when a length of a region which the peripheral surface 2423 contacts the aforementioned other one of the inner surfaces 211 along a direction parallel to the optical axis X is L, a protruding height of the annular marking structure 2424 is h, a distance from the annular marking structure 2424 to the gate trace 243 along a direction perpendicular to the optical axis X is t, a perpendicular distance between the arc portion 2425 and the optical axis X is da, a perpendicular distance between the annular marking structure 2424 and the optical axis X is dm, a maximum radius of the peripheral surface 2423 is ds, and a maximum radius of the image-side optical surface 2412 is di, the conditions related to the parameters can be satisfied as the following Table 6.

TABLE 6 the third lens element 240 according to the 2nd embodiment

| da (mm) | 1.412 | dm/ds | 0.934 |
|---|---|---|---|
| dm (mm) | 1.541 | di/dm | 0.597 |
| da/dm | 0.916 | L (mm) | 0.04 |
| ds (mm) | 1.65 | h (mm) | 0.06 |
| di (mm) | 0.92 | t (mm) | 0.077 |

In the third lens element 240, a curvature radius Ra of each of the two arc portions 2425, 2426 is 0.05 mm and 0.025 mm.

3rd Embodiment

Figure 3A:
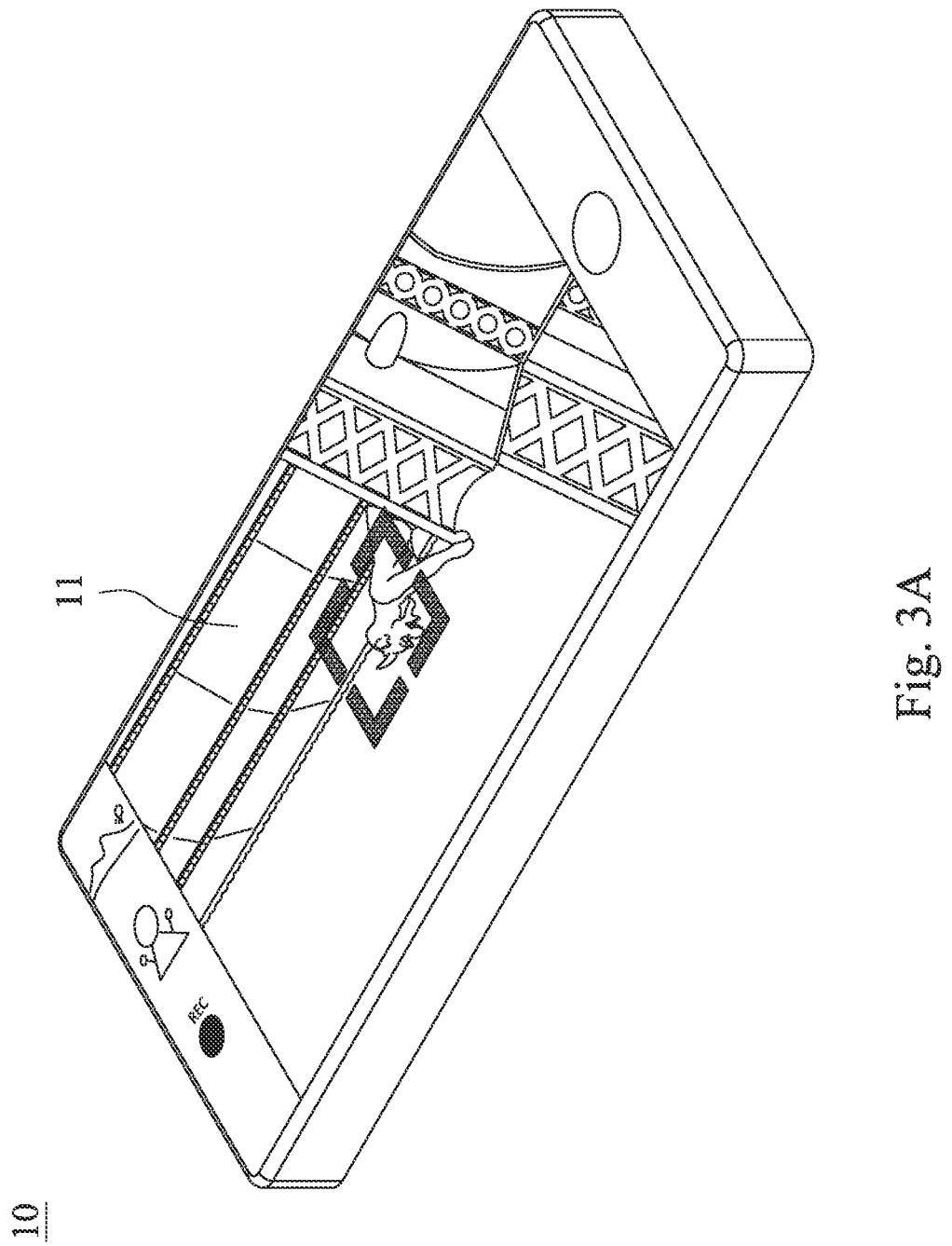
FIG. 3A shows a schematic view of an electronic device according to the 3rd embodiment of the present disclosure.
Figure 3B:
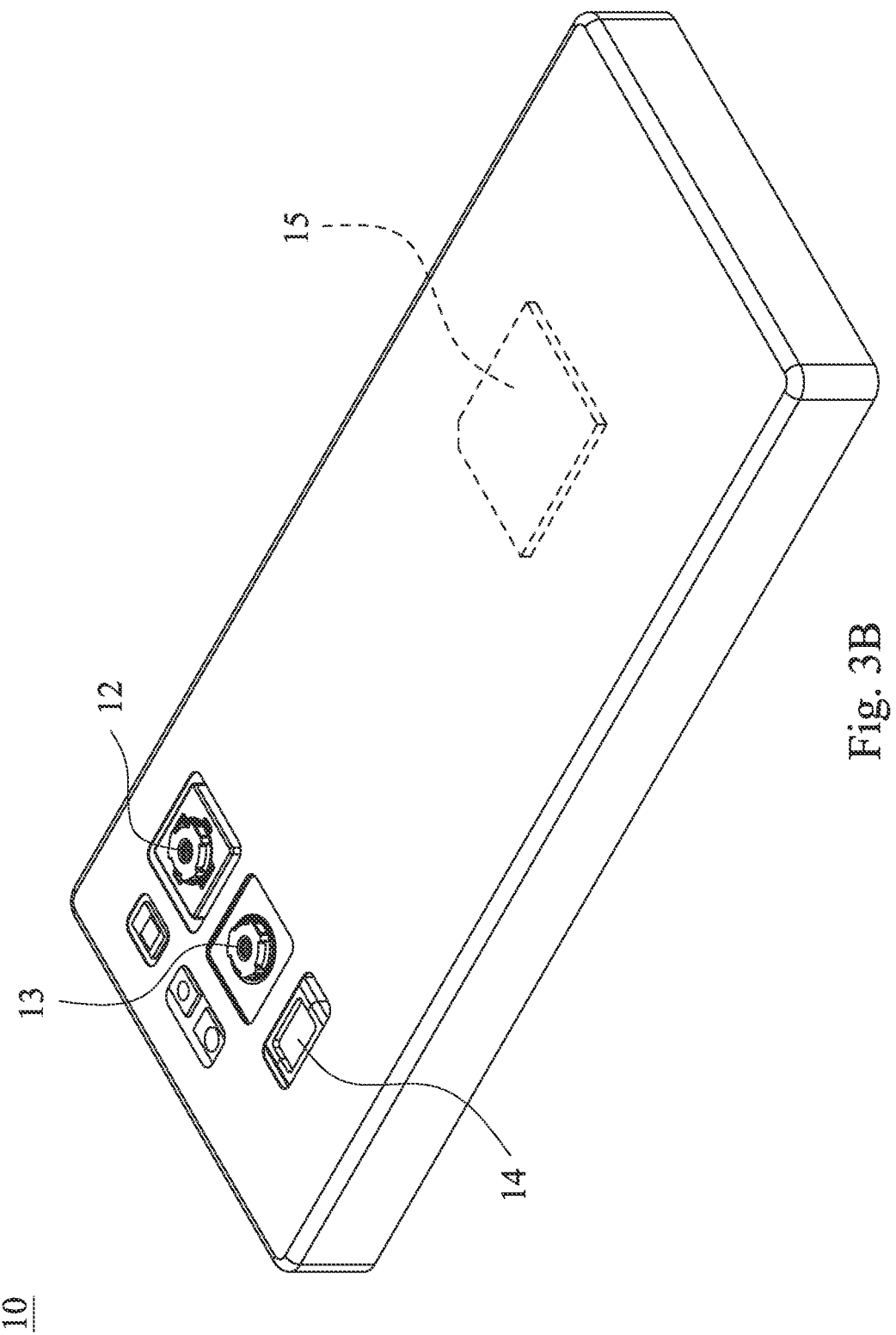
FIG. 3B shows another schematic view of the electronic device according to the 3rd embodiment in FIG. 3A.

FIG. 3A shows a schematic view of an electronic device 10 according to the 3rd embodiment of the present disclosure. FIG. 3B shows another schematic view of the electronic device 10 according to the 3rd embodiment in FIG. 3A. In FIGS. 3A and 3B, the electronic device 10 according to the 3rd embodiment is a smartphone, and the electronic device 10 includes at least one camera module. In the 3rd embodiment, a number camera module is three, wherein the three camera modules are an ultra-wide angle camera module 12, a high-pixel camera module 13 and a telephoto camera module 14, respectively. Furthermore, each of the camera modules can include the imaging lens assembly module according to any one of the 1st embodiment to the 2nd embodiment and an image sensor (not shown), and the image sensor is disposed on an image surface (not shown) of the imaging lens assembly module, but the present disclosure is not limited thereto. Hence, it is favorable for fulfilling a mass production and an appearance requirement of a camera module in the recent market of electronic devices.

Furthermore, the user can activate the capturing mode by a user interface 11 of the electronic device 10, wherein the user interface 11 according to the 3rd embodiment can be a touch screen for displaying a screen and having a touch function, and the user interface 11 can be for manually adjusting field of view to switch the different camera modules. At this moment, the camera module collects an imaging light on the image sensor and outputs electronic signals associated with images to an image signal processor (ISP) 15.

Furthermore, the electronic device 10 can further include, but not be limited to, a display, a control unit, a storage unit, a random-access memory (RAM), a read-only memory (ROM), or the combination thereof.

Figure 3C:
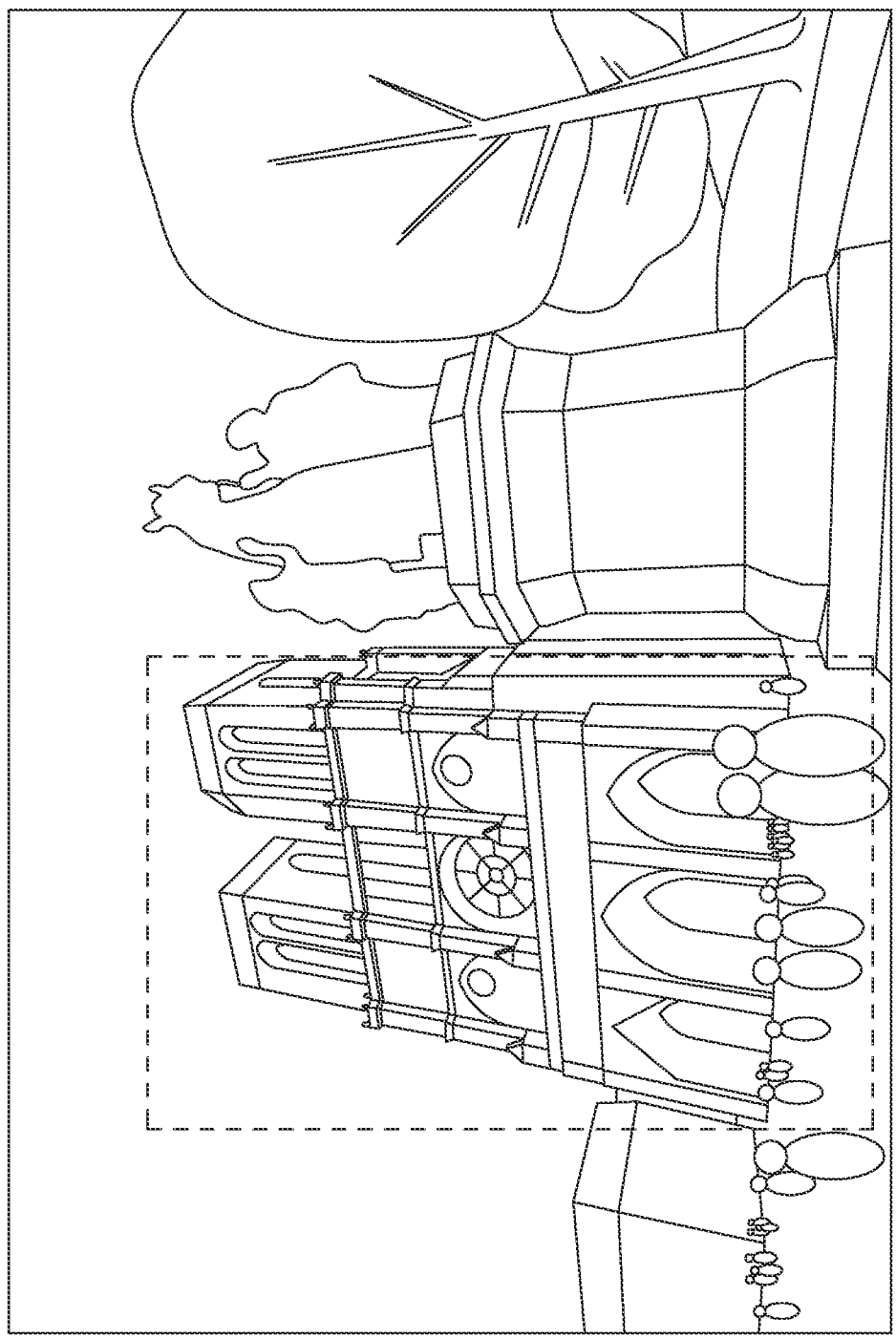
FIG. 3C is a schematic view of an image captured by the ultra-wide angle camera module according to the 3rd embodiment in FIG. 3A.

FIG. 3C is a schematic view of an image captured by the ultra-wide angle camera module 12 according to the 3rd embodiment in FIG. 3A. In FIG. 3C, a larger ranged image can be captured via the ultra-wide angle camera module 12, and the ultra-wide angle camera module 12 has a function for containing more views.

Figure 3D:
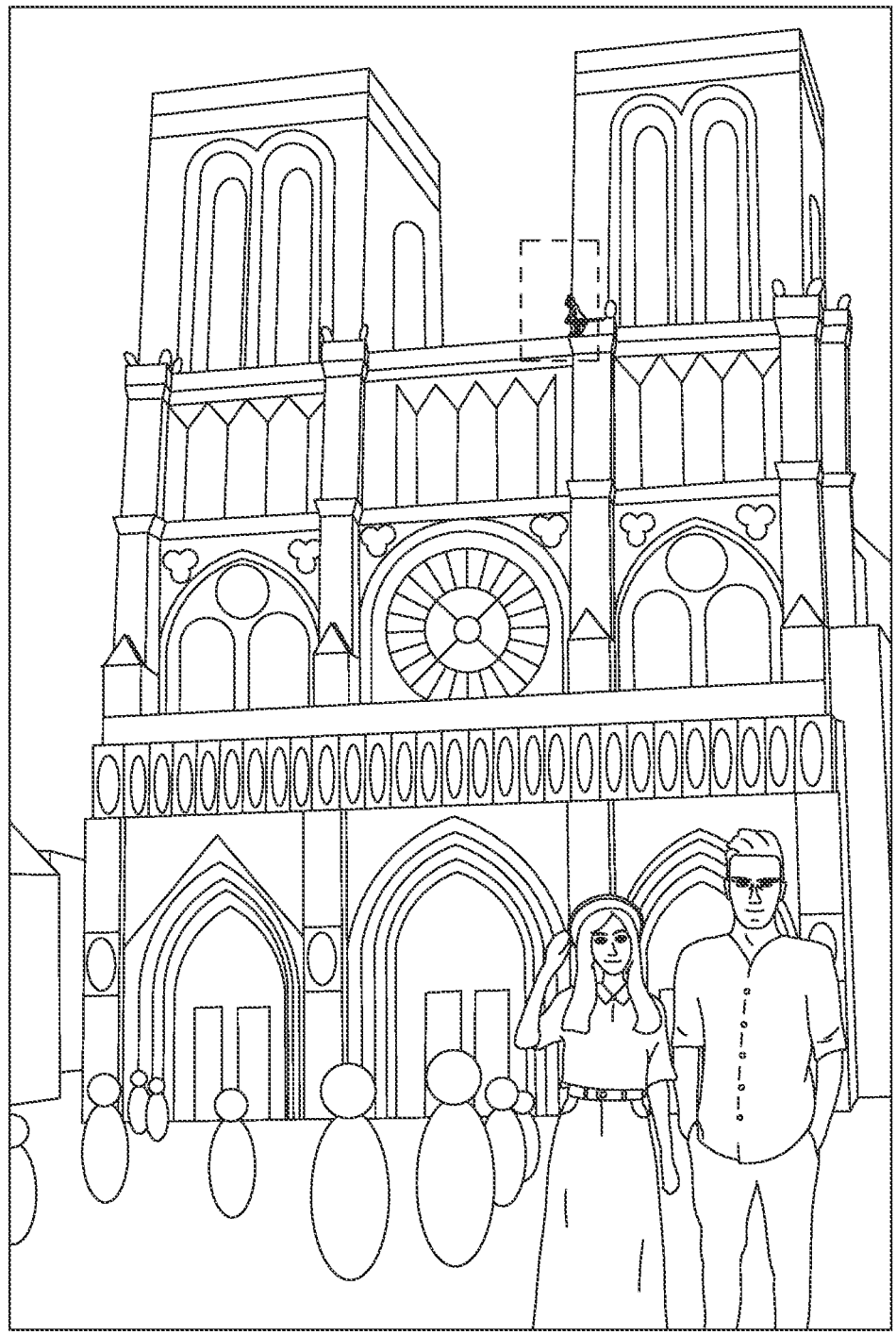
FIG. 3D is a schematic view of an image captured by the high-pixel camera module according to the 3rd embodiment in FIG. 3A.

FIG. 3D is a schematic view of an image captured by the high-pixel camera module 13 according to the 3rd embodiment in FIG. 3A. In FIG. 3D, a certain ranged and high-pixel image can be captured via the high-pixel camera module 13, and the high-pixel camera module 13 has a function for high resolution and low distortion.

Figure 3E:
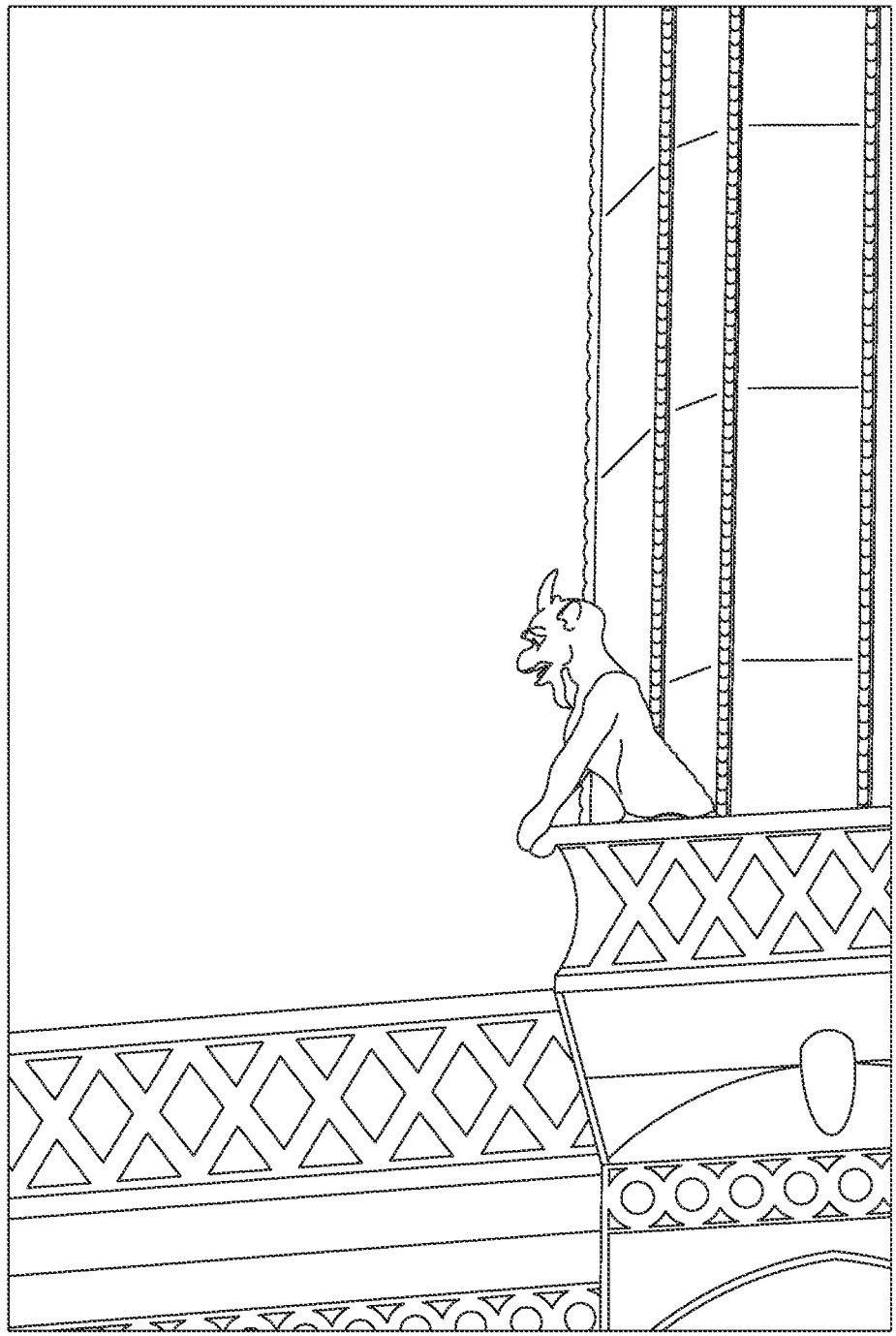
FIG. 3E is a schematic view of an image captured by the telephoto camera module according to the 3rd embodiment in FIG. 3A.

FIG. 3E is a schematic view of an image captured by the telephoto camera module 14 according to the 3rd embodiment in FIG. 3A. In FIG. 3E, a far image can be captured and enlarged to a high magnification via the telephoto camera module 14, and the telephoto camera module 14 has a function for a high magnification.

In FIGS. 3C-3E, when an image is captured via the camera module having various focal lengths and processed via a technology of an image processing, a zoom function of the electronic device 10 can be achieved.

4th Embodiment

Figure 4:
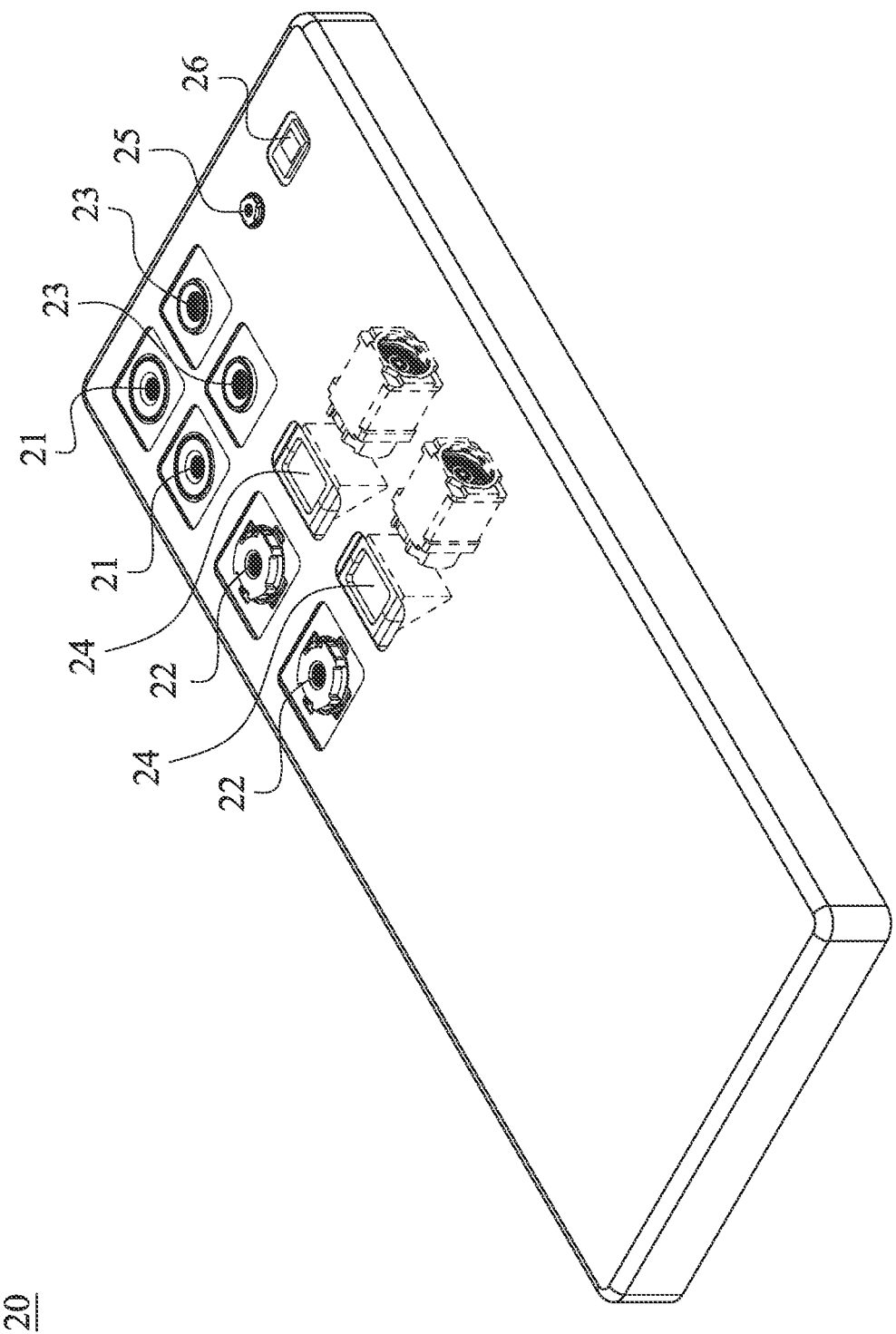
FIG. 4 shows a schematic view of an electronic device according to the 4th embodiment of the present disclosure.

FIG. 4 shows a schematic view of an electronic device 20 according to the 4th embodiment of the present disclosure. In FIG. 4, the electronic device 20 according to the 4th embodiment is a smartphone, the electronic device 20 includes at least one camera module. In the 4th embodiment, a number camera module is nine, wherein the three camera modules are two ultra-wide angle camera modules 21, two wide angle camera modules 22, two high-pixel camera modules 23, two telephoto camera module 24 and a time-of-flight (TOF) module 25, respectively. Furthermore, each of the camera modules can include the imaging lens assembly module according to any one of the 1st embodiment and the 2nd embodiment and an image sensor (not shown), the image sensor is disposed on an image surface (not shown) of the imaging lens assembly module, but the present disclosure is not limited thereto. Hence, it is favorable for fulfilling a mass production and an appearance requirement of a camera module in the recent market of electronic devices.

According to the specification of the electronic device 20, the electronic device 20 can further include at least one auxiliary element (not shown). In the 4th embodiment, the auxiliary element is a flash module 26. The flash module 26 is for compensating the color temperature. Hence, the camera module of the present disclosure can provide better image capturing experience.

5th Embodiment

Figure 5A:
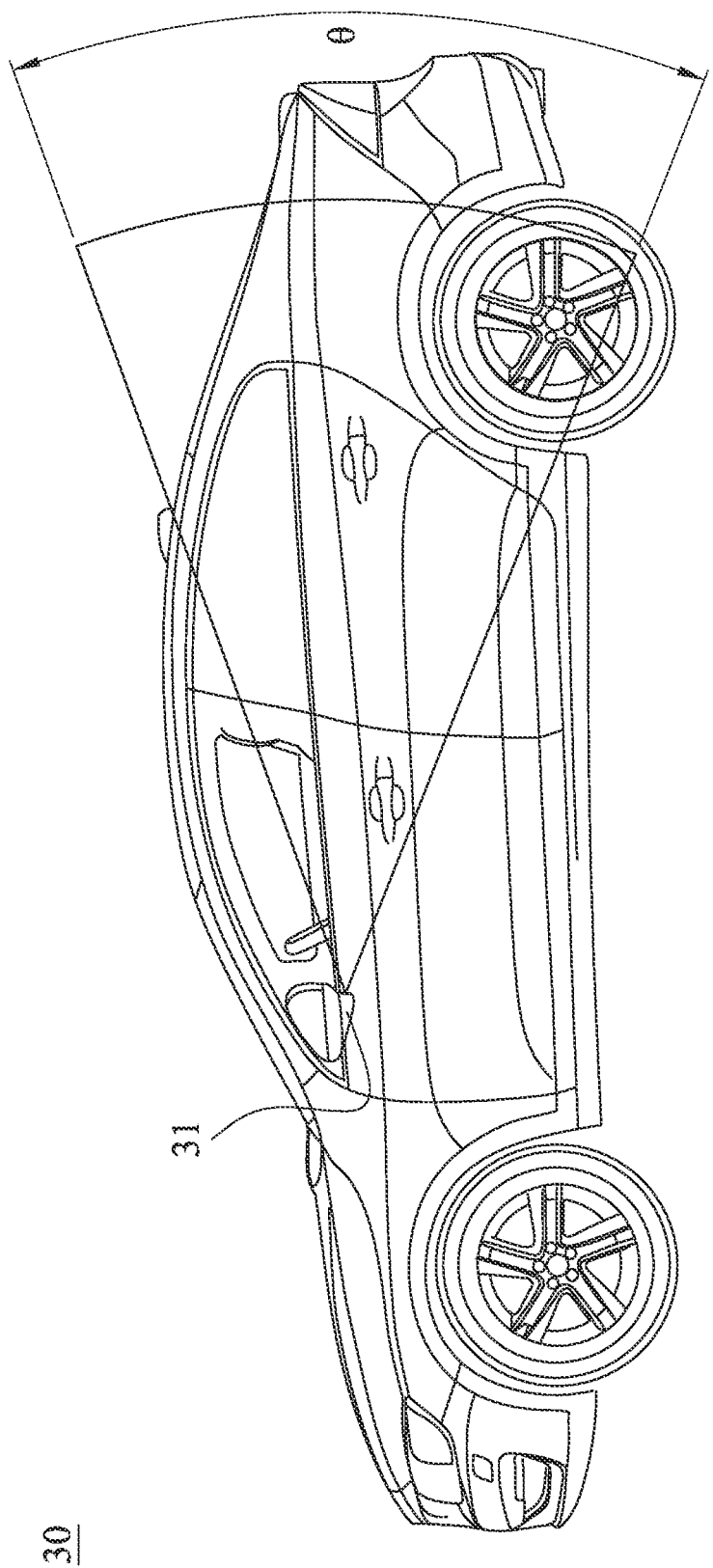
FIG. 5A shows a schematic view of the vehicle device according to the 5th embodiment of the present disclosure.

FIG. 5A shows a schematic view of the vehicle device 30 according to the 5th embodiment of the present disclosure. As shown in FIG. 5A, the vehicle device 30 includes a plurality of camera modules 31. Each of the camera modules 31 can include the imaging lens assembly module according to any one of the 1st embodiment and the 2nd embodiment and an image sensor (not shown), the image sensor is disposed on an image surface (not shown) of the imaging lens assembly module, but the present disclosure is not limited thereto.

In the 5th embodiment, two of the camera modules 31 are located under two rear view mirrors on the left side and the right side of the vehicle device 30, respectively. Each of the two camera modules 31 captures image information from a field of view θ. Specifically, the field of view θ can satisfy the following condition: 40 degrees<θ<90 degrees. Hence, the image information in the regions of two lanes on the left side and the right side.

Figure 5C:
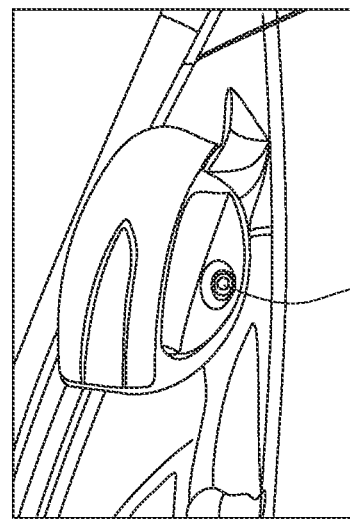
FIG. 5C shows a partial enlarged view of the vehicle device according to the 5th embodiment in FIG. 5B.
Figure 5B:
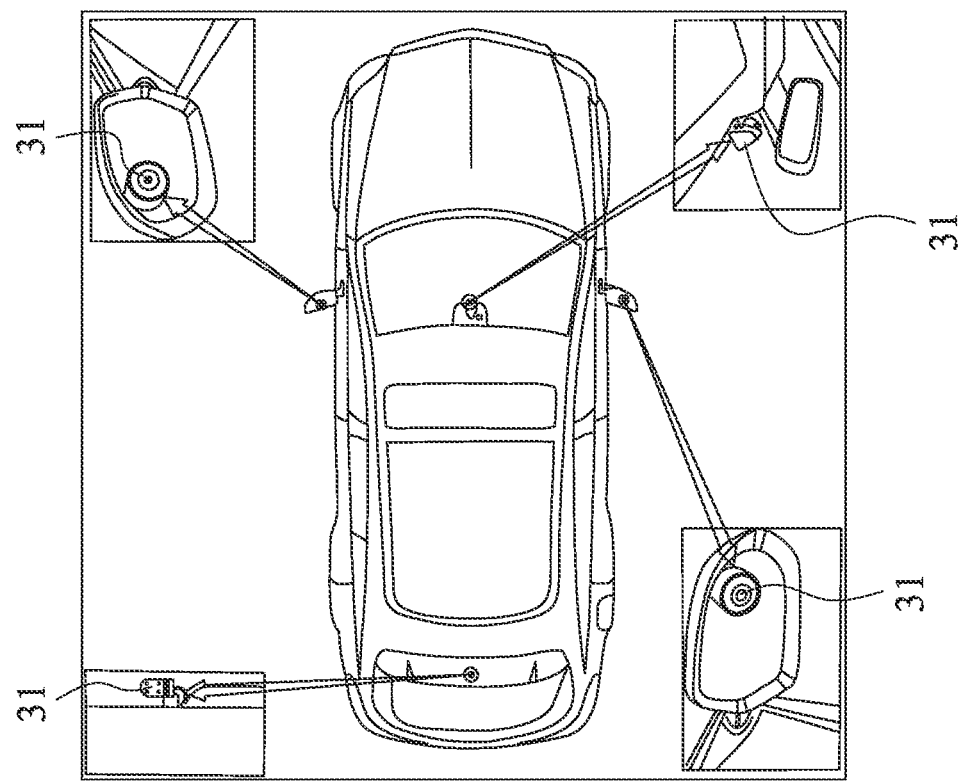
FIG. 5B shows a top view of the vehicle device according to the 5th embodiment in FIG. 5A.

FIG. 5B shows a top view of the vehicle device 30 according to the 5th embodiment in FIG. 5A. FIG. 5C shows a partial enlarged view of the vehicle device 30 according to the 5th embodiment in FIG. 5B. FIG. 5D shows another schematic view of the vehicle device 30 according to the 5th embodiment in FIG. 5A. As shown in FIGS. 5B and 5C, two of the camera modules 31 can be disposed in an inner space of the vehicle device 30. Specifically, the aforementioned two camera modules 31 can be disposed near a rear view mirror in the vehicle device 30 and a rear window, respectively. Moreover, two of the camera modules 31 can be disposed on non-mirror surfaces of two rear view mirrors on left and right side of the vehicle device 30, respectively. As shown in FIG. 5D, via the configuration of the camera modules 31, it is favorable for the user obtaining the external space information out of the driving seat, such as the external space information S1, S2, S3, S4, but the present disclosure is not limited thereto. Hence, the angle of view can be provided widely to decrease the blind spot, and it is favorable for improving driving safety.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, having an optical axis and comprising at least one lens element, and the lens element comprising:
   an optical effective region, the optical axis passing through the optical effective region; and
   a peripheral portion surrounding the optical effective region, and the peripheral portion comprising:
   an object-side surface facing towards an object side;
   an image-side surface facing towards an image side and corresponding to the object-side surface;
   a peripheral surface connecting the object-side surface and the image-side surface;
   an annular marking structure disposed on one of the object-side surface and the image-side surface, and the annular marking structure being an annular tip-ended protruding structure and surrounding the optical axis; and
   at least one arc portion disposed on the other one of the object-side surface and the image-side surface, and the arc portion being an annular protruding arc;
   wherein a perpendicular distance between the annular marking structure and the optical axis is dm, a perpendicular distance between the arc portion and the optical axis is da, a curvature radius of the arc portion is Ra, and the following conditions are satisfied:

$0.82 < da/dm < 1.18$; and $0.025 \text{ mm} \leq Ra \leq 0.5 \text{ mm}$.

2. The imaging lens assembly of claim 1, wherein the lens element is formed by injection molding and further comprises at least one gate trace, and the gate trace is disposed on the peripheral surface.

3. The imaging lens assembly of claim 2, wherein a distance from the annular marking structure to the gate trace along a direction perpendicular to the optical axis is t, and the following condition is satisfied:

$t \leq 0.4 \text{ mm}$.

4. The imaging lens assembly of claim 1, wherein the curvature radius of the arc portion is Ra, and the following condition is satisfied:

$0.035 \text{ mm} \leq Ra \leq 0.45 \text{ mm}$.

5. The imaging lens assembly of claim 1, wherein the perpendicular distance between the annular marking structure and the optical axis is dm, a maximum radius of the peripheral surface is ds, and the following condition is satisfied:

$0.7 < dm/ds < 1.0$.

6. The imaging lens assembly of claim 1, wherein the optical effective region comprises:
   an object-side optical surface facing towards the object side; and
   an image-side optical surface facing towards the image side, wherein at least one of the object-side optical surface and the image-side optical surface is an optical aspheric surface.

7. The imaging lens assembly of claim 1, wherein a protruding height of the annular marking structure is h, and the following condition is satisfied:

$0.0025 \text{ mm} \leq h \leq 0.1 \text{ mm}$.

8. An imaging lens assembly module, comprising:
   a lens barrel having a plurality of inner surfaces and forming an inner space; and
   an imaging lens assembly disposed in the inner space of the lens barrel, the imaging lens assembly having an optical axis and comprising at least one lens element, and the lens element comprising:
   an optical effective region, the optical axis passing through the optical effective region; and
   a peripheral portion surrounding the optical effective region, and the peripheral portion comprising:

an object-side surface facing towards an object side;

an image-side surface facing towards an image side and corresponding to the object-side surface;

a peripheral surface connecting the object-side surface and the image-side surface, and physically contacting one of the inner surfaces of the lens barrel;

an annular marking structure only disposed on the image-side surface, and the annular marking structure being an annular tip-ended protruding structure and surrounding the optical axis; and at least one arc portion disposed on the object-side surface, and the arc portion being an annular protruding arc;

wherein a perpendicular distance between the annular marking structure and the optical axis is dm, a perpendicular distance between the arc portion and the optical axis is da, a curvature radius of the arc portion is Ra, and the following conditions are satisfied:

$0.75 < da/dm < 1.25$; and $0.025\ mm \leq Ra \leq 0.5\ mm$.

9. The imaging lens assembly module of claim 8, wherein the object-side surface of the lens element comprises an axial aligning structure for abutting against and aligning at center of an adjacent lens element.

10. The imaging lens assembly module of claim 8, wherein the image-side surface of the lens element comprises an axial aligning structure for abutting against and aligning at center of an adjacent lens element.

11. The imaging lens assembly module of claim 8, wherein the curvature radius of the arc portion is Ra, and the following condition is satisfied:

$0.035\ mm \leq Ra \leq 0.45\ mm$.

12. The imaging lens assembly module of claim 8, wherein the perpendicular distance between the annular marking structure and the optical axis is dm, a maximum radius of the peripheral surface is ds, and the following condition is satisfied:

$0.8 < dm/ds < 1.0$.

13. The imaging lens assembly module of claim 8, wherein a length of a region which the peripheral surface contacts the one of the inner surfaces along a direction parallel to the optical axis is L, and the following condition is satisfied:

$L < 0.1\ mm$.

14. The imaging lens assembly module of claim 8, wherein the optical effective region comprises:

an object-side optical surface facing towards the object side; and an image-side optical surface facing towards the image side, wherein at least one of the object-side optical surface and the image-side optical surface is an optical aspheric surface.

15. The imaging lens assembly module of claim 14, wherein the perpendicular distance between the annular marking structure and the optical axis is dm, a maximum radius of the image-side optical surface is di, and the following condition is satisfied:

$0.3 < di/dm < 0.8$.

16. The imaging lens assembly module of claim 8, wherein a protruding height of the annular marking structure is h, and the following condition is satisfied:

$0.0025\ mm \leq h \leq 0.1\ mm$.

17. A camera module, comprising:

the imaging lens assembly module of claim 8; and an image sensor disposed on an image surface of the imaging lens assembly module.

18. An electronic device, comprising:

the camera module of claim 17.

* * * * *